(12) United States Patent
Sekiya et al.

(10) Patent No.: US 11,594,020 B2
(45) Date of Patent: Feb. 28, 2023

(54) CROWN IDENTIFICATION DEVICE, IDENTIFICATION METHOD, PROGRAM, AND RECORDING MEDIUM

(71) Applicants: NEC Solution Innovators, Ltd., Tokyo (JP); THE UNIVERSITY OF TOKYO, Tokyo (JP)

(72) Inventors: Kazuki Sekiya, Tokyo (JP); Hiroaki Ochiai, Tokyo (JP); Yurika Nagoshi, Tokyo (JP); Wei Guo, Tokyo (JP); Yue Mu, Tokyo (JP); Masayuki Hirafuji, Tokyo (JP); Seishi Ninomiya, Tokyo (JP); Daisuke Takata, Tokyo (JP)

(73) Assignees: NEC Solution Innovators, Ltd., Tokyo (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 17/040,395

(22) PCT Filed: Oct. 5, 2018

(86) PCT No.: PCT/JP2018/037373
§ 371 (c)(1),
(2) Date: Sep. 22, 2020

(87) PCT Pub. No.: WO2019/181025
PCT Pub. Date: Sep. 26, 2019

(65) Prior Publication Data
US 2021/0019496 A1    Jan. 21, 2021

(30) Foreign Application Priority Data

Mar. 23, 2018    (JP) .............................. JP2018-057034

(51) Int. Cl.
*G06V 20/13*    (2022.01)
*G06T 7/62*    (2017.01)
(Continued)

(52) U.S. Cl.
CPC .............. *G06V 20/13* (2022.01); *A01G 7/00* (2013.01); *A01G 17/00* (2013.01); *G01N 21/17* (2013.01); *G06T 7/62* (2017.01)

(58) Field of Classification Search
CPC ........ G06V 20/13; G06V 20/188; A01G 7/00; A01G 17/00; G01N 21/17; G06T 7/62;
(Continued)

(56) References Cited

U.S. PATENT DOCUMENTS

| 2008/0260237 A1 | 10/2008 | Savolainen et al. | |
| 2014/0099000 A1* | 4/2014 | Shamir | G06V 10/25 |
| | | | 382/110 |
| 2019/0094196 A1* | 3/2019 | Park | H04W 16/22 |

FOREIGN PATENT DOCUMENTS

| CN | 2007-066050 | * | 3/2007 | |
| CN | 101672915 | * | 3/2010 | ............... G01S 7/48 |

(Continued)

OTHER PUBLICATIONS

Search report provided by Applicant: (First Office Action dated Sep. 15, 2021 in Chinese Application No. 201880091604.8) (Year: 2021).*

(Continued)

*Primary Examiner* — Amara Abdi
(74) *Attorney, Agent, or Firm* — Sughrue Mion, PLLC

(57) ABSTRACT

The present invention provides a system for identifying individual crowns of individual fruit trees using aerial images. A crown identification device 40 of the present invention includes an identification criterion determination unit 41 and a crown identification unit 42. The identification criterion determination unit 41 includes a first image acquisition section 411 that acquires a first aerial image including a plurality of individual fruit trees in a deciduous period in a fruit farm field, a skeleton extraction section 412 that (Continued)

processes the first aerial image to extract a whole crown skeleton including the plurality of individual fruit trees, a vertex extraction unit 413 that extracts vertexes of each crown skeleton corresponding to each individual fruit tree, and an identification criterion extraction section 414 that extracts a crown candidate region of a minimum polygonal shape including all the vertexes as an identification criterion for each individual fruit tree and extracts a centroid of the crown candidate region. The crown identification unit 42 includes a second image acquisition section 421 that acquires a second aerial image of the fruit tree farm field at the time of identifying a crown at the same scale as the first aerial image, a whole crown extraction section 422 that processes the second aerial image to extract a whole crown image including the plurality of individual fruit trees, and a crown identification section 423 that collates the crown candidate region and the centroid of the identification criterion with the whole crown image to identify a crown region of each individual fruit tree in the second aerial image.

11 Claims, 17 Drawing Sheets

(51) Int. Cl.
*A01G 7/00* (2006.01)
*A01G 17/00* (2006.01)
*G01N 21/17* (2006.01)

(58) Field of Classification Search
CPC . G06T 2207/10028; G06T 2207/10032; G06T 2207/20044; G06T 2207/30188; G06T 2207/30242; G06T 7/174; G06T 7/187; G06T 7/11; G01C 11/04
See application file for complete search history.

(56) References Cited

FOREIGN PATENT DOCUMENTS

| CN | 101672915 A | 3/2010 |
|---|---|---|
| CN | 103793686 A | 5/2014 |
| CN | 103942838 A | 7/2014 |
| CN | 104463164 A | 3/2015 |
| JP | 2007-033931 A | 2/2007 |
| JP | 2007066050 A | 3/2007 |
| JP | 2008-152425 A | 7/2008 |
| JP | 2011-103098 A | 5/2011 |
| JP | 2014-006148 A | 1/2014 |
| JP | 2014-100099 A | 6/2014 |
| JP | 2016-000024 A | 1/2016 |
| JP | 2017-169520 A | 9/2017 |
| WO | 2005/088252 A1 | 9/2005 |

OTHER PUBLICATIONS

Chao et al, "Cluster-based Construction of Tree Crown from Scanned Data", 2009 Plant Growth Modeling and Applications, IEEE, pp. 352-359) (Year: 2009).*

Guo et al, ("Evaluation of Branching and Pruning Effects of Peach Trees Using Drone Aerial Photographs", IDEAS Joint Usage/Joint Research Report 2017 by Chubu University, Mar. 2017, pp. 1-8, based on partial translation provided by Applicant in IDS) (Year: 2017).*

Haris et al. "Construction of a high-resolution digital map to support citrus breeding using an autonomous multicopter" III International Symposium on Citrus Biotechnology, vo. 1135, 2016, pp. 73-84) (Year: 2016).*

Shi et al., ("Unmanned Aerial Vehicles for High-Throughput Phenotyping and Agronomic Research", PloS one, vol. 11. No. 7, e0159781. Jul. 29, 2016 ) (Year: 2016).*

Muramoto et al., ("Sensing Technology for Environmental Monitoring-approaches Approaches Using Multispectral Data at Various Spatiotemporal Scales", ITE Technical Report, vol. 29, No. 35 pp. 13-20, 2005) (Year: 2005).*

Yamamoto et al., ("Matching Tree Crowns Obtained by Satellite Imagery with Ground Measurement Data" IEICE Technical Report, vol. 106 No. 156 pp. 23-28, 2006) (Year: 2006).*

Aaron Patrick et al., "High Throughput Phenotyping of Blueberry Bush Morphological Traits Using Unmanned Aerial Systems", Remote Sensing, pp. 1-19, 2017, vol. 9, No. 1250.

Ramon A. Diaz-Varela, et al., "High-Resolution Airborne UAV Imagery to Assess Olive Tree Crown Parameters Using 3D Photo Reconstruction: Application in Breeding Trials", Remote Sensing, 2015, pp. 4213-4232, vol. 7.

Dimitrios Panagiotidis et al., "Determining tree height and crown diameter from high-resolution UAV imagery", International Journal of Remote Sensing, 2016, pp. 1-19.

P.J. Zarco-Tejada et al., "Tree height quantification using very high resolution imagery acquired from an unmanned aerial vehicle (UAV) and automatic 3D photo-reconstruction methods", European Journal of Agronomy, 2014, pp. 89-99, vol. 55.

Yeyin Shi, et al., "Unmanned Aerial Vehicles for High-Throughput Phenotyping and Agronomic Research", PLOS ONE, Jul. 29, 2016, pp. 1-26, vol. 11, e0159781.

Robert W Dunford, et al., "Potential and constraints of Unmanned Aerial Vehicle technology for the characterization of Mediterranean riparian forest", International Journal of Remote Sensing, Oct. 10, 2009, pp. 4915-4935, vol. 30, No. 19.

Hajime Nobuhara, "Aerial Imaging for Field Crop Phenotyping", Journal of the Robotics Society of Japan, Mar. 15, 2016, pp. 51-54, vol. 34, No. 2.

Ryo Sugiura et al., "Estimating late blight severity on potato using multi-temporal UAV imagery", Proceedings of the 57th Annual Conference of the Institute of Systems, Control and Information Engineers, May 15-17, 2013, pp. 1-3.

Ryo Sugiura, "High-Throughput Field Phenotyping Using Aerial Imagery from Drone", Journal of the Robotics Society of Japan, Jun. 15, 2017, pp. 9-11, vol. 35, No. 5.

Kiichiro Kumagai et al., "Development of the Spatial Analysis Method of Vegetation Distributions in an Urban Area in Terms of Prevention of the Fire Spreading", Theory and Applications of GIS, Dec. 31, 2009, pp. 45-56, vol. 17, No. 2.

Wei Guo et al., "Evaluation of Branching and Pruning Effects of Peach Trees Using Drone Aerial Photographs", IDEAS Joint Usage/ Joint Research Report 2017 by Chubu University, Mar. 2017, 8 pages.

Wei Guo et al., "Evaluation of canopy structure of peach tree by using consumer level unmanned aerial vehicles", EFITA WCCA Congress, Jul. 2-6, 2017, 2 pages, Montpellier, France.

Wei Guo, et al., "Evaluation of canopy structure of peach tree by using consumer level unmanned aerial vehicles", EFITA WCCA Congress (oral presentation), Jul. 2-6, 2017, 23 pages, Montpellier, France.

Yue Mu, et al., "E-cultivation: a semi-automatic tool for estimating 3D branch angle and crown parameter of peach tree", Japanese Society of Agricultural Informatics in 2017, The Institute of Electronics, Information and Communication Engineers, and Technical Committee on Ambient Intelligence and Sensor Networks, Joint Conference, Nov. 16, 2017, 1 page, Tsuruoka-shi, Japan.

International Search Report for PCT/JP2018/037372 dated Dec. 25, 2018 [PCT/ISA/210].

International Search Report for PCT/JP2018/037373 dated Jan. 15, 2019 [PCT/ISA/210].

First Office Action dated Sep. 15, 2021 in Chinese Application No. 201880091604.8.

Liu Jianli, "Research on the Inventory of Forest Structure Parameters Using UAV Stereo Imagery", Chinese Master's Theses Full-text Database Agriculture Science and Technology, No. 2, 2018, pp. D049-134 (13 pages total).

(56) References Cited

OTHER PUBLICATIONS

Sugiura et al., "Development of High-Throughput Field Phenotyping System Using Imagery from Unmanned Aerial Vehicle", 2015 ASABE Annual International Meeting. American Society of Agricultural and Biological Engineers, Paper No. 152152494, Jul. 26-29, 2015 (8 pages total).

Shi et al., "Unmanned Aerial Vehicles for High-Throughput Phenotyping and Agronomic Research", PloS one, vol. 11, No. 7, e0159781, Jul. 29, 2016 (26 pages total).

Haris et al. "Construction of a high-resolution digital map to support citrus breeding using an autonomous multicopter" III International Symposium on Citrus Biotechnology, vo. 1135, 2016, pp. 73-84 (12 pages total).

Non-Final Office Action dated Feb. 18, 2022 issued in U.S. Appl. No. 16/763,675.

Jianhua Zhou et al., "Mathematic descriptors for identifying plant species: A case study on urban landscape vegetation", Journal of Remote Sensing, 2011, vol. 15, No. 3, pp. 524-538 (15 pages total).

Communication dated Mar. 8, 2022 from the Chinese Patent Office in Chinese Application No. 201880091604.8.

Notice of Allowance dated Jun. 13, 2022 in co-pending U.S. Appl. No. 16/763,675.

Andrew Niccolai et al., "Point Set Topology Extraction for Branch and Crown-level Species Classification", Photogrammetric Engineering & Remote Sensing, 2010, vol. 76, No. 3, pp. 319-330 (12 pages total).

Office Action dated Oct. 11, 2022 in Japanese Application No. 2019-553741.

Japanese Office Action corresponding to Japanese Patent Application No. 2019-553741, dated Dec. 14, 2022.

Muramoto et al., Sensing Technology for Environmental Monitoring—Approaches Using Multispectral Data at Various Spatiotemporal Scales; ITE Technical Report, vol. 29, No. 35 pp. 13-20, 2005.

Yamamoto et al., Matching Tree Crowns Obtained By Satellite Imagery With Ground Measurement Data, IEICE Technical Report, vol. 106 No. 156 pp. 23-28, 2006.

\* cited by examiner

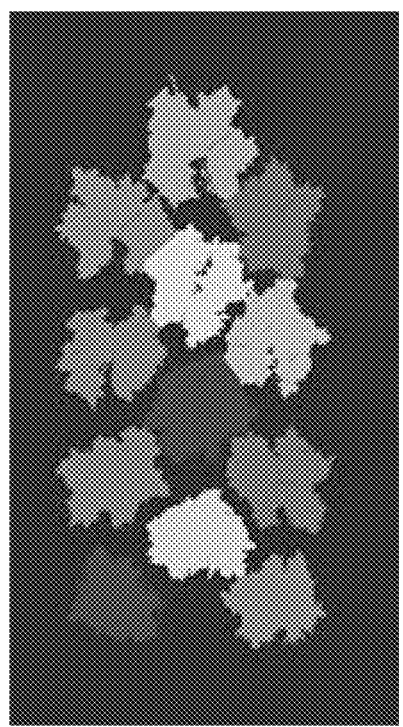
FIG. 8A
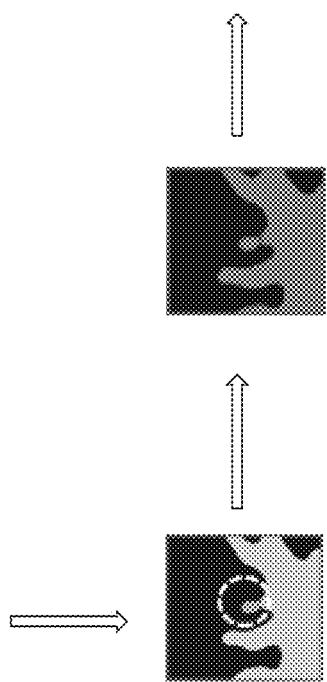
FIG. 8B
FIG. 8C
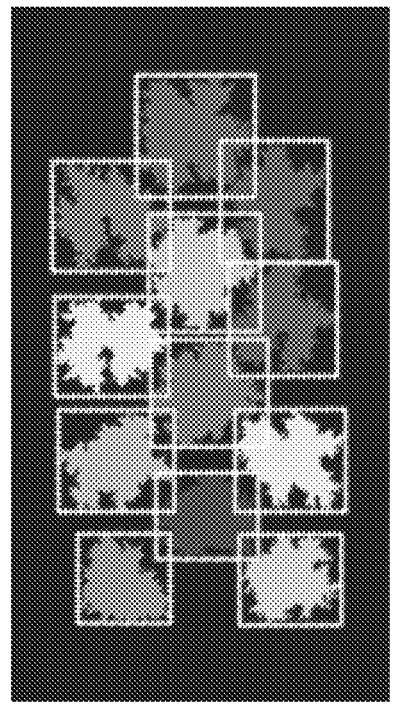
FIG. 8D

CROWN IDENTIFICATION DEVICE, IDENTIFICATION METHOD, PROGRAM, AND RECORDING MEDIUM

CROSS REFERENCE TO RELATED APPLICATIONS

This application is a National Stage of International Application No. PCT/JP2018/037373 filed Oct. 5, 2018, claiming priority based on Japanese Patent Application No. 2018-057034 filed Mar. 23, 2018, the disclosure of which is incorporated herein in its entirety by reference.

TECHNICAL FIELD

The present invention relates to a crown identification device, an identification method, a program, and a recording medium.

BACKGROUND ART

In the breeding of fruit trees, pruning is very important. By carrying out pruning, space for growth of the branches is secured and workability of bud thinning and fruit thinning is improved. In general, fruit farmers walk in the field to check the state of the crown for each individual fruit tree and carry out pruning and cultivation management as necessary. However, the larger the field, the more labor and cost are required to walk the field and check the crown.

Therefore, in recent years, there has been proposed a method of obtaining an aerial image of the field using drone or the like to check the state of the crown of each fruit tree (Non Patent Literatures 1 to 6). If the state of the individual crowns of individual fruit trees can be analyzed on the basis of the aerial image, it becomes possible to prune and cultivate the fruit trees more easily by referring to the information. However, crowning of fruit trees is complicated to optimize production of unit area, and it is difficult to extract individual crowns by the reported calculation method because the crowns of individual fruit trees are overlapped in the aerial image in a state where leaves grow on fruit trees.

CITATION LIST

Patent Literature

Non Patent Literature

Non Patent literature 1: Patrick A, Li C. High Throughput Phenotyping of Blueberry Bush Morphological Traits Using Unmanned Aerial Systems. Remote Sens 2017; 9: 1250.
Non Patent literature 2: Diaz-Varela R A, de la Rosa R, Leon L, Zarco-Tejada P J. High-Resolution Airborne UAV Imagery to Assess Olive Tree Crown Parameters Using 3D Photo Reconstruction: Application in Breeding Trials. Remote Sens 2015; 7: 4213-4232.
Non Patent literature 3: Panagiotidis D, Abdollahnejad A, Surovy P, Chiteculo V. Determining tree height and crown diameter from high-resolution UAV imagery. Int J Remote Sens 2016; 1-19.
Non Patent literature 4: Zarco-Tejada P J, Diaz-Varela R, Angileri V, Loudjani P. Tree height quantification using very high resolution imagery acquired from an unmanned aerial vehicle (UAV) and automatic 3D photo-reconstruction methods. Eur J Agron 2014; 55: 89-99.
Non Patent literature 5: Shi Y, Thomasson J A, Murray S C et al. Unmanned Aerial Vehicles for High-Throughput Phenotyping and Agronomic Research. PLOS ONE 2016; 11: e0159781.
Non Patent literature 6: Dunford R, Michel K, Gagnage M, Piegay H, Tremelo M-L. Potential and constraints of Unmanned Aerial Vehicle technology for the characterization of Mediterranean riparian forest. Int J Remote Sens 2009; 30: 4915-4935.

SUMMARY OF INVENTION

Technical Problem

It is therefore an object of the present invention to provide a new system for identifying individual crowns of individual fruit trees using aerial images of a field, for example.

Solution to Problem

In order to achieve the aforementioned object, the present invention provides an identification device for identifying a crown of an individual fruit tree in an image, the identification device including: an identification criterion determination unit and a crown identification unit; the identification criterion determination unit including a first image acquisition section that acquires a first aerial image including a plurality of individual fruit trees in a deciduous period in a fruit farm field, a skeleton extraction section that processes the first aerial image to extract a whole crown skeleton including the plurality of individual fruit trees, a vertex extraction unit that extracts vertexes of each crown skeleton corresponding to each individual fruit tree, and an identification criterion extraction section that extracts a crown candidate region of a minimum polygonal shape including all the vertexes as an identification criterion for each individual fruit tree and extracts a centroid of the crown candidate region, the crown identification unit including a second image acquisition section that acquires a second aerial image of the fruit tree farm field at the time of identifying a crown at the same scale as the first aerial image, a whole crown extraction section that processes the second aerial image to extract a whole crown image including the plurality of individual fruit trees, and a crown identification section that collates the crown candidate region and the centroid of the identification criterion with the whole crown image to identify a crown region of each individual fruit tree in the second aerial image.

The present invention also provides an identification method for identifying crowns of a plurality of individual fruit trees in an image, the identification method including: an identification criterion determination step and a crown identification step; the identification criterion determination step including: a first image acquisition step of acquiring a first aerial image including a plurality of individual fruit trees in a deciduous period in a fruit farm field, a skeleton extraction step of processing the first aerial image to extract a whole crown skeleton including the plurality of individual fruit trees, a vertex extraction step of extracting vertexes of each crown skeleton corresponding to each individual fruit tree; and an identification criterion extraction step of extracting a crown candidate region of a minimum polygonal shape including all the vertexes as an identification criterion for each individual fruit tree and extracting a centroid of the crown candidate region, the crown identification step including: a second image acquisition step of acquiring a second aerial image of the fruit tree farm field at the time of identifying a crown at the same scale as the first aerial image; a whole crown extraction step of processing the second aerial image to extract a whole crown image including the plurality of individual fruit trees, and a crown identification step of collating the crown candidate region and the centroid of the identification criterion with the whole crown image to identify a crown region of each individual fruit tree in the second aerial image.

The present invention also provides a program for a computer to execute the identification method according to the present invention.

The present invention also provides a computer readable recording medium with the program according to the present invention.

Advantageous Effects of Invention

According to the present invention, for example, by utilizing the aerial image during the deciduous period, it is possible to easily identify crowns of individual fruit trees with better accuracy. For this reason, the present invention is extremely useful for the cultivation of fruit trees in orchards.

BRIEF DESCRIPTION OF DRAWINGS

FIGS. 8A to 8D are examples of images in the first example embodiment.

DESCRIPTION OF EMBODIMENTS

Figure 1:
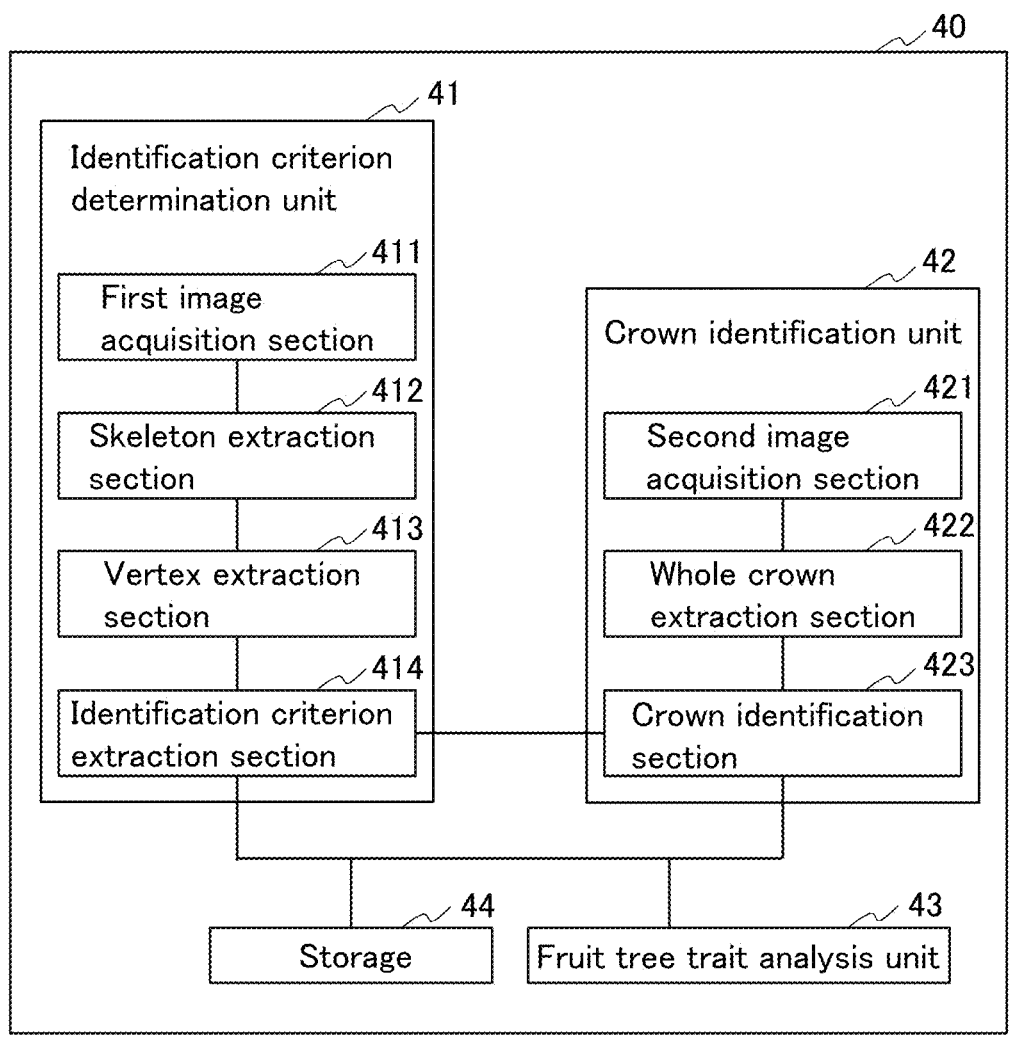
FIG. 1 is a block diagram illustrating an example of an identification device of the first example embodiment.

Embodiments of the present invention will be described with reference to the drawings. Note here that the present invention is not limited to the following example embodiments. In the drawings, identical parts are denoted by identical reference numerals. Each example embodiment can be described with reference to the descriptions of other example embodiments, unless otherwise specified, and the configurations of the example embodiments may be combined, unless otherwise specified.

First Example Embodiment

FIG. 1 is a block diagram illustrating the configuration of an example of the identification device 40 of the present example embodiment. The identification device 40 includes an identification criterion determination unit 41 and a crown identification unit 42. The identification criterion determination unit 41 includes a first image acquisition section 411, a skeleton extraction section 412, a vertex extraction section 413, and an identification criterion extraction section 414. The crown identification unit 42 includes a second image acquisition section 421, a whole crown extraction section 422, and a crown identification section 423. The identification device 40 may further include, for example, a fruit tree trait analysis unit 43 and a storage 44. The identification device 40 is also referred to as an identification system, for example.

The identification device 40 may be, for example, one presentation device including the components, or may be a presentation device to which the components are connectable via a communication network. The communication network is not particularly limited, and a known network can be used. The communication network may be, for example, a wired network or a wireless network. Examples of the communication network include an Internet line, a telephone line, and a local area network (LAN), and a wireless fidelity (WiFi).

The identification device 40 may further include an output unit. For example, the identification device 40 includes, as the output unit, a display unit such as a display to be described later and may output information obtained by the identification device 40 to the display unit. The identification device 40 may include, for example, a communication device to be described later as the output unit, and may be connectable to an external device via a communication network. In this case, the identification device 40 may output information obtained by the identification device 40 to the external device via the communication network. The external device is not particularly limited, and examples thereof include imaging devices such as a camera and terminals such as a personal computer (PC), a mobile phone, a smart phone, and a tablet. The communication network is not particularly limited and is the same as described above.

Figure 2:
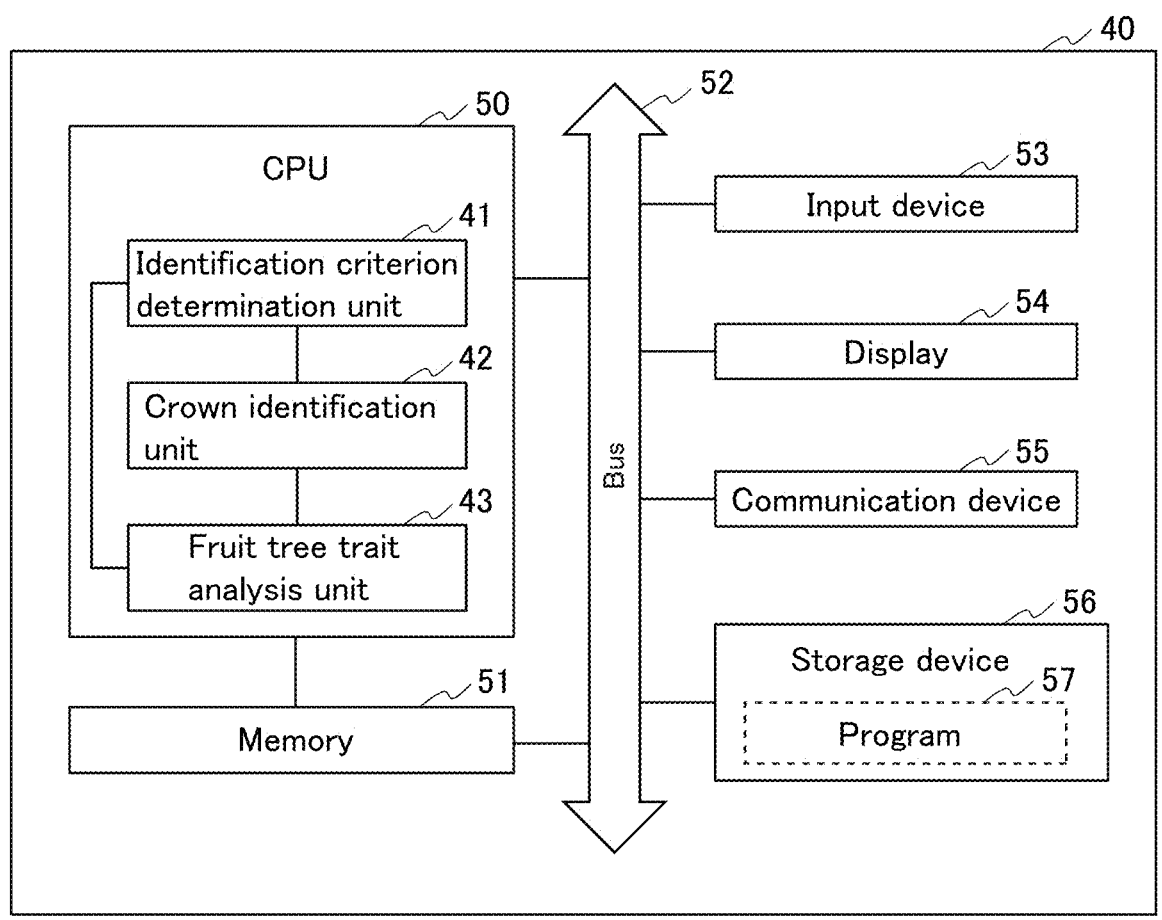
FIG. 2 is a block diagram illustrating an example of the hardware configuration of the identification device of the first example embodiment.

FIG. 2 is a block diagram illustrating an example of a hardware configuration of the identification device 40. The identification device 40 includes, for example, a central processing unit (CPU) 50 as a processor, a memory 51, a bus 52, an input device 53, a display 54, a communication device 55, a storage device 56, and the like. The components of the identification device 40 are connected to each other via the bus 52 by, for example, respective interfaces.

The CPU 50 serves to control the entire control of the identification device 40. In the identification device 40, the CPU 50 executes, for example, the program of the present invention and other programs, and reads and writes various pieces of information. Specifically, for example, the CPU 50 of the identification device 40 functions as an identification criterion determination unit 41, a crown identification unit 42, and a fruit tree trait analysis unit 43.

The identification device 40 is connectable to a communication network by the communication device 55 connected to the bus 52, for example, and is connectable to the external device via the communication network.

The memory 51 includes, for example, a main memory, and the main memory is also referred to as a main storage device. When the CPU 50 performs processing, the memory 51 reads various kinds of operation programs 57 such as the program of the present invention stored in an auxiliary storage device to be described later, and the CPU 50 receives data from the memory 51 and executes a program 57, for example. The main memory is, for example, a random access memory (RAM). The memory 51 further includes, for example, a read-only memory (ROM).

The storage device 56 is also referred to as, for example, an auxiliary storage relative to the main memory (main storage). The storage device 56 includes, for example, a storage medium and a drive for reading from and writing to the storage medium. The storage medium is not particularly limited and may be of, for example, a built-in type or an external type, and examples thereof include a hard disc (HD), a Floppy® card (FD), a CD-ROM, a CD-R, a CD-RW, an MO, a DVD, a flash memory, and a memory card. The drive is not particularly limited. The storage device 56 may be, for example, a hard disk drive (HDD) in which the storage medium and the drive are integrated. The storage device 56 stores, for example, the program 57 as mentioned above, and when the CPU 50 is actuated, the memory 51 reads the program 57 from the storage device 56 as mentioned above. The storage device 56 is, for example, the storage 44, and stores information input to the identification device 40, information processed by the identification device 40, and the like.

The identification device 40 may further include, for example, an input device 53 and a display 54. Examples of the input device 53 include a touch panel, a mouse, and a keyboard. Examples of the display 54 include an LED display and a liquid crystal display.

As described above, the identification criterion determination unit 41 includes a first image acquisition section 411, a skeleton extraction section 412, a vertex extraction section 413, and an identification criterion extraction section 414.

The first image acquisition section 411 acquires a first aerial image F including a plurality of individual fruit trees in a deciduous period in a fruit farm field. The first image acquisition section 411 may acquire the first aerial image F by inputting it using the input device 53 or by receiving it from the external device via the communication network, for example.

The first aerial image F is an image of a fruit tree farm field in a deciduous period and includes a plurality of individual fruit trees. The deciduous period is, for example, a period when leaves fall off from the branches, and in the case of fruit trees, it is generally, for example, a winter period, specifically, around November to March in Japan. The aerial image of the fruit tree farm field in the deciduous period can be, for example, an aerial image of the fruit tree farm field where leaves have fallen off. The first aerial image F can be obtained by an unmanned aerial vehicle such as a drone, for example.

Figure 3A:
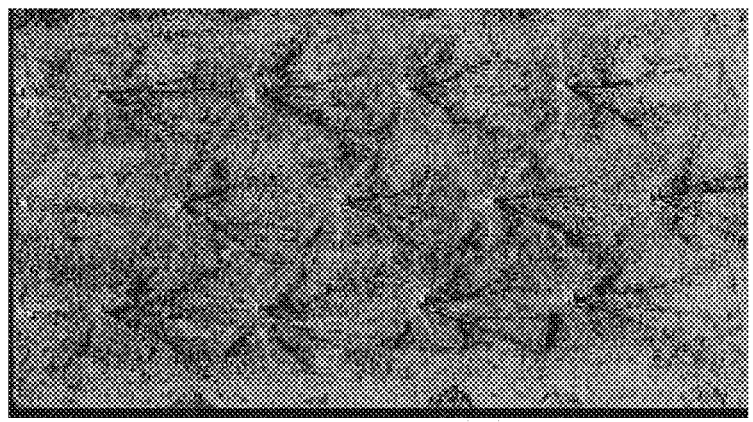
FIGS. 3A to 3C are examples of images in the first example embodiment.
Figure 3B:
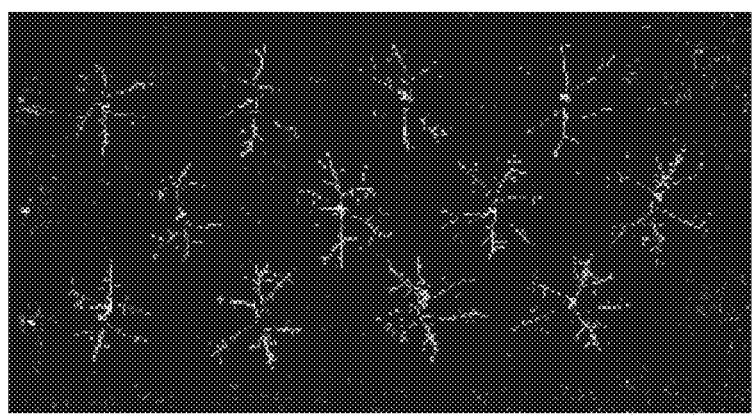
Figure 3C:
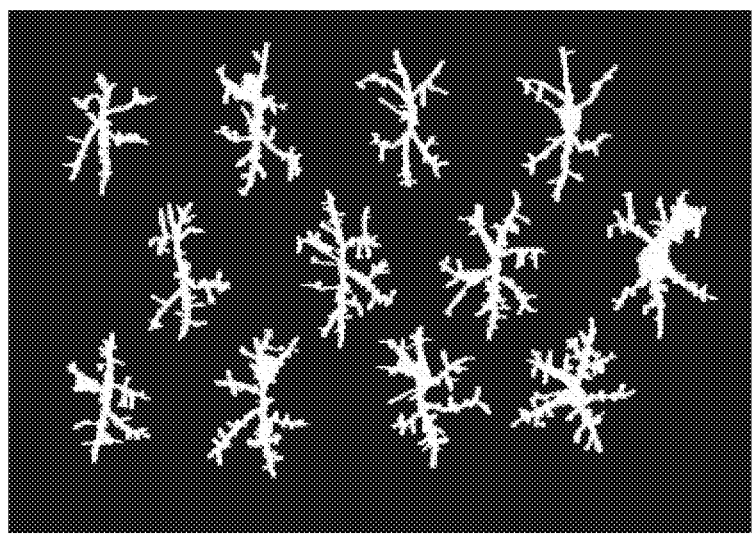

The skeleton extraction section 412 processes the first aerial image F to extract a whole crown skeleton F including a plurality of individual fruit trees. How to process images is not particularly limited. As a specific example, this will be described with reference to FIGS. 3A to 3C. A 3D image reflecting the heights of the fruit trees and the like as shown in FIG. 3B can be reconstructed from the aerial image as shown in FIG. 3A by referring to the imaging condition and the like, for example, and skeletons F of the crowns of the fruit trees can be extracted from this 3D image as shown in FIG. 3C. The crown generally means a portion of the tree above the ground, such as branches, leaves, stems, and the like of the tree.

The crown skeletons F can be extracted, for example, using adaptive filtering or image morphology processing.

The vertex extraction section 413 extracts vertexes of each crown skeleton corresponding to each individual fruit tree. The identification criterion extraction section 414 extracts a crown candidate region F of a minimum polygonal shape including as an identification criterion and extracts a centroid F of the crown candidate region F for each individual fruit tree. The crown candidate region F is a region of a minimum polygonal shape including all the vertexes of the corresponding crown skeleton and is specifically, for example, a region of a projected minimum polygonal shape.

Figure 4A:
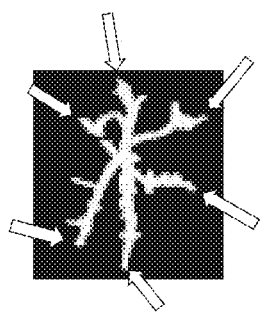
FIGS. 4A and 4B are examples of images in the first example embodiment.

The extraction of the crown candidate region F will be described below with reference to FIGS. 4A and 4B as a specific example. The image of the crown skeletons F shown in FIG. 3C includes crown skeletons of 12 individual fruit trees. As shown in FIG. 4A, the vertex extraction section 413 extracts all vertexes of the corresponding crown skeleton of each individual fruit tree. Then, as shown in FIG. 4B, the identification criterion extraction section 414 can extract a region (also referred to as a polygon) of the smallest polygonal shape surrounded by a gray line including all the vertexes as each crown candidate region F.

Figure 4B:
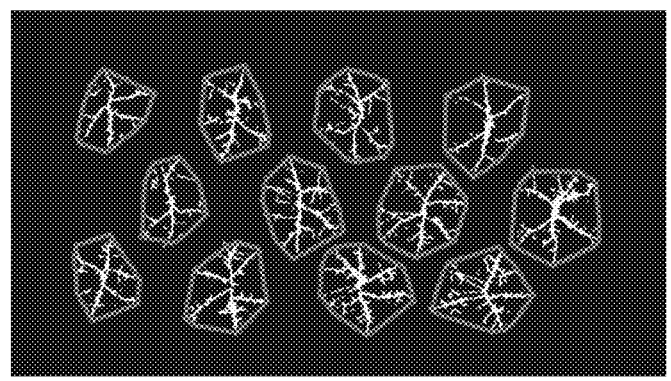
Figure 5A:
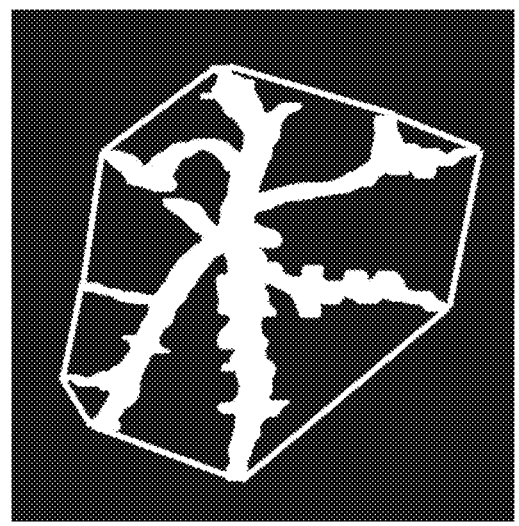
FIGS. 5A and 5B are examples of images in the first example embodiment.
Figure 5B:
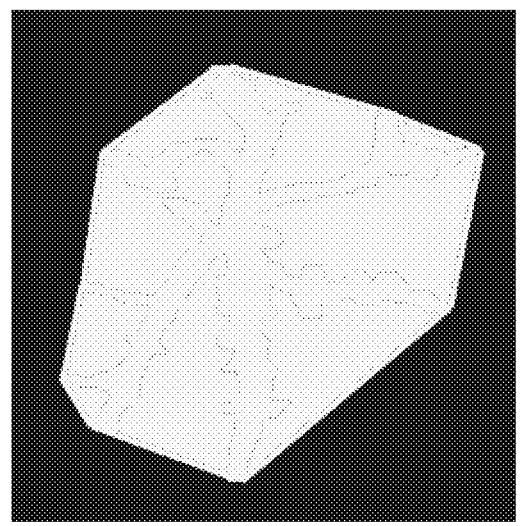

FIGS. 5A and 5B illustrate FIG. 4B in more detail. As indicated by the white line in FIG. 5A, the outer frame of the crown candidate region F serving as an identification criterion can be extracted by the polygon of the minimum polygonal shape including all the vertexes. FIG. 5B illustrates the outer frame indicating the crown candidate region F in FIG. 5A as a black-and-white masked image.

Further, the identification criterion extraction section 414 extracts the centroid F from the crown candidate region F. How to determine the centroid F of the crown candidate region F is not particularly limited, and the centroid F can be determined by a commonly used method from the moment of the black-and-white masked image of FIG. 5B.

The crown identification unit 42 includes a second image acquisition section 421, a whole crown extraction section 422, and a crown identification section 423.

The second image acquisition section 421 acquires a second aerial image S of the fruit tree farm field at the time of identifying a crown at the same scale as the first aerial image. The second aerial image S is not particularly limited, and may be an image at the time when it is necessary to identify crowns of fruit trees for training and pruning. The second aerial image S may be, for example, only an image (e.g., S1) at a specific time, or may be a plurality of images (e.g., S1, S2, S3, [ . . . ], Sn, n is a positive integer) obtained over time at a plurality of times.

In the present invention, a crown is identified using a crown candidate region F extracted on the basis of the first aerial image F by the identification criterion determination unit 41 and the centroid F thereof. The second aerial image S is an image at the same scale as the first aerial image F. The second aerial image S may be brought to be at the same scale as the first aerial image F by imaging under the same condition as the first aerial image F or by image processing in advance even if imaged under different conditions, for example.

The whole crown extraction section 422 processes the second aerial image S to extract a whole crown image S including the plurality of individual fruit trees. As described above, at the time when it is necessary to identify the crown, the branches and leaves of the fruit trees overlap with those of the adjacent fruit trees. Thus, it is difficult to distinguish the boundaries in the aerial image. The whole crown extraction section 422 processes the second aerial image S not for each individual fruit tree, but to extract a whole crown image S of the plurality of fruit trees.

Figure 6A:
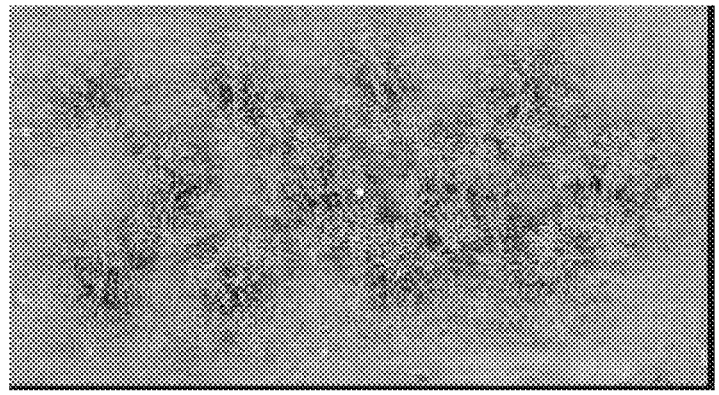
FIGS. 6A to 6C are examples of images in the first example embodiment.
Figure 6B:
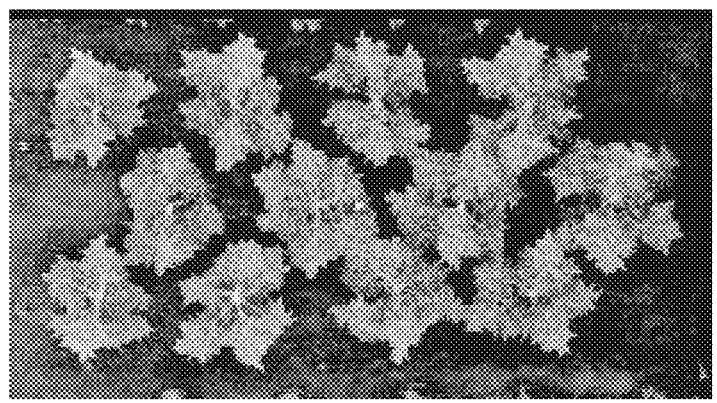
Figure 6C:
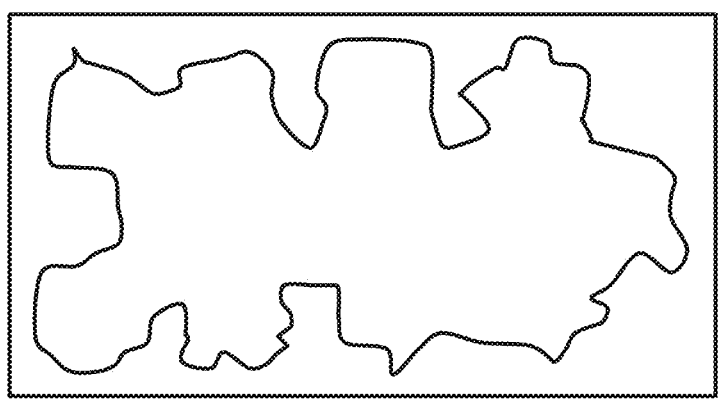

How to process images is not particularly limited. A specific example thereof will be described below with reference to FIGS. 6A to 6C. A 3D image reflecting the heights of the fruit trees and the like as shown in FIG. 6B can be reconstructed from the aerial image as shown in FIG. 6A by referring to the imaging condition and the like, for example, and a whole crown image S of individual fruit trees can be extracted from this 3D image as shown in FIG. 6C. The whole crown image S can be extracted, for example, using adaptive filtering or image morphology processing as described above.

The crown identification section 423 collates the crown candidate region F and the centroid F of the identification criterion with the whole crown image S to identify a crown region S of each individual fruit tree. As described above, in the first aerial image F, the crown region F and the centroid thereof are extracted for each individual fruit tree in the first aerial image F. The first aerial image F and the second aerial image S are at the same scale. Therefore, by collating the crown candidate region F as the identification criterion and the centroid thereof with the whole crown image S derived from the second aerial image S, a crown region of each individual fruit tree in the second aerial image S can be identified.

The crown identification section 423 may extract a crown candidate region on the basis of the whole crown image S and may then identify the final crown region, for example. That is, first, the crown candidate region and the centroid of the identification criterion may be collated with the whole crown image to extract a crown candidate region S of each individual fruit tree, and the crown region of each individual fruit tree is then identified from the crown candidate region S and a minute region surrounding the crown candidate region S. The extraction of the crown candidate region S on the basis of the crown region F and the centroid thereof as the identification criterion and the identification of the crown region S from the crown candidate region S will be described in more detail below.

Figure 7A:
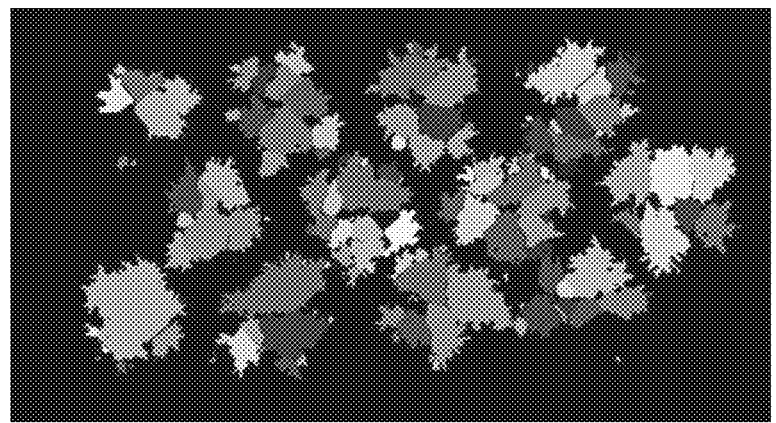
FIGS. 7A and 7B are examples of images in the first example embodiment.
Figure 7B:
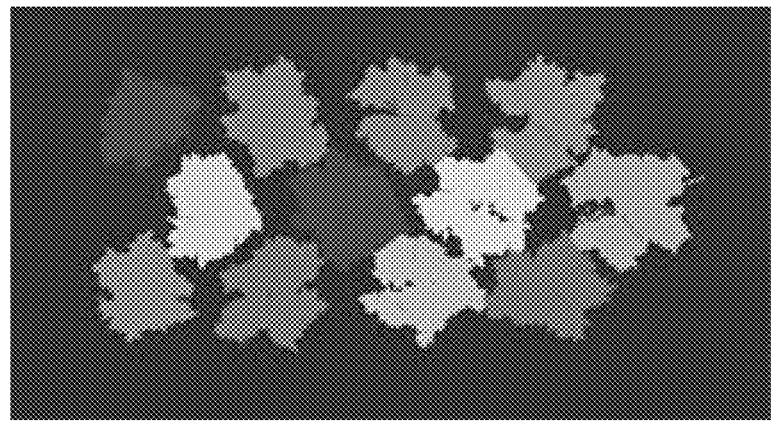

The whole crown image S is processed by a generic Watershed transformation method, so that the tree crown image of each individual fruit tree is divided into a plurality of regions as shown in FIG. 7A. Then, using the crown candidate region F and the centroid F thereof as initial values of the Watershed transformation method in the image of FIG. 7A, the plurality of regions are integrated, and a crown candidate region S is extracted as shown in FIG. 7B.

In each crown candidate region S shown in FIG. 8A (the same drawing as FIG. 7B), an uneven minute region S exists around the crown candidate region S (for example, a region surrounded by a dotted line) as shown in FIG. 8B. Therefore, by calculating an Euclidean distance between the crown candidate region S and the surrounding minute region S and, as shown in FIG. 8C, integrating the crown candidate region S and the minute region, a final crown region S can be identified as shown in FIG. 8D.

As described above, the identification device 40 may further include a fruit tree trait analysis unit 43 that analyzes an identified crown region, for example. The trait of the crown region is, for example, a crown projected area, a crown diameter, a crown shape, or the like. The information of these traits is obtained by statistical analysis, for example, from each crown region in the image.

Figure 9:
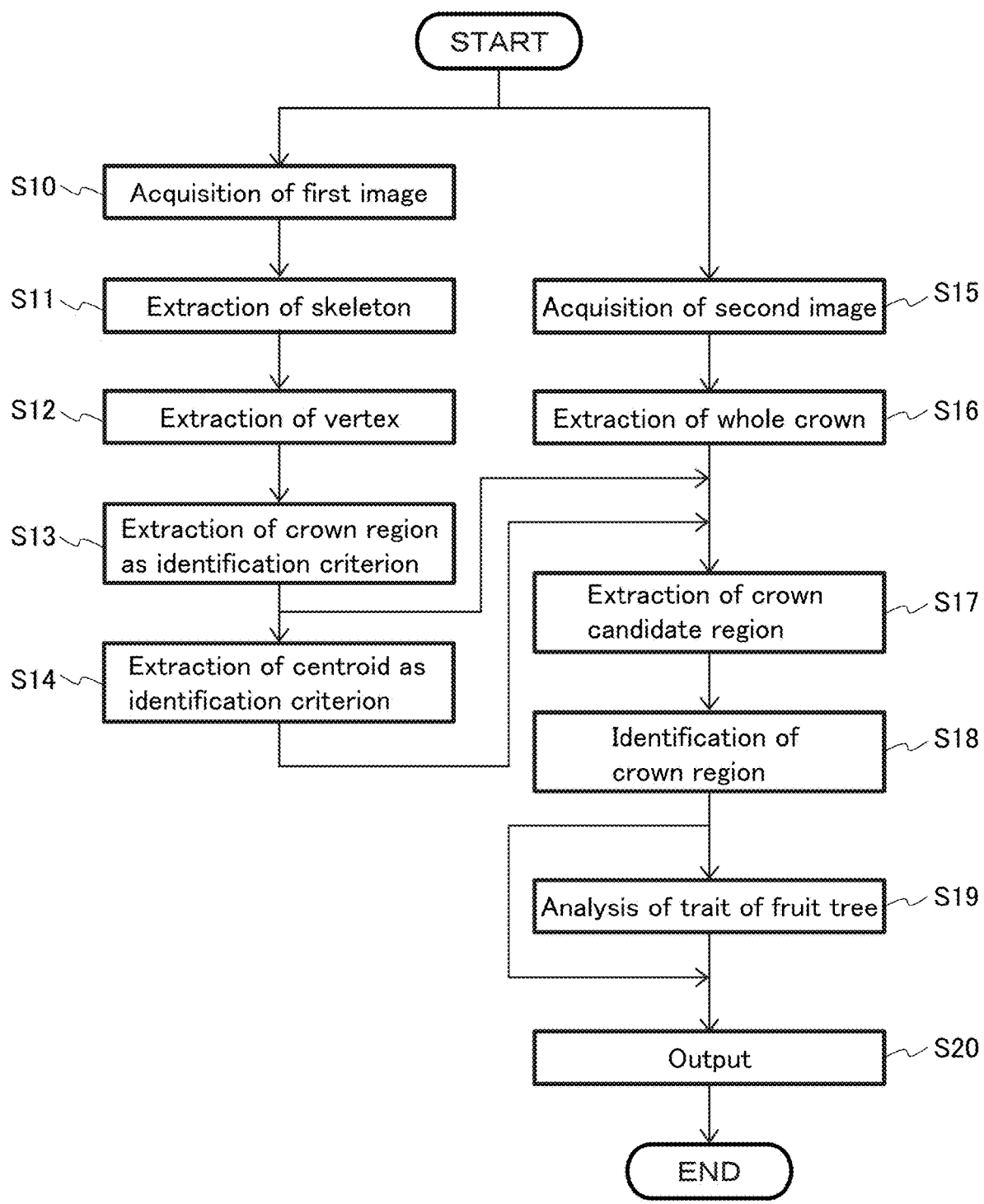
FIG. 9 is a flowchart illustrating an example of the identification method of the first example embodiment.

Next, the identification method of the present example embodiment will be described with reference to the flowchart of FIG. 9 as an example. The identification method of the present example embodiment can be performed using the identification device 40 of FIG. 1, for example. The identification method of the present example embodiment is not limited to the use of the identification device 40 of FIG. 1.

First, the first image acquisition step, the skeleton extraction step, the vertex extraction step, and the identification criterion extraction step are executed as an identification criterion determination step.

Specifically, in the first image acquisition step, the first image acquisition section 411 acquires a first aerial image including a plurality of individual fruit trees in a deciduous period in a fruit farm field (S10). Then, in the skeleton extraction step, the skeleton extraction section 412 processes the first aerial image to extract a whole crown skeleton including the plurality of individual fruit trees (S11). Further, in the vertex extraction step, the vertex extraction section 413 extracts vertexes of each crown skeleton corresponding to each individual fruit tree (S12). Next, in the identification criterion extraction step, the identification criterion extraction section 414 extracts a crown candidate region of a minimum polygonal shape including all the vertexes as an identification criterion for each individual fruit tree and extracts a centroid of the crown candidate region (S13). Then, the identification criterion extraction section 414 further extracts, as an identification criterion, a centroid of the crown candidate region for each individual fruit tree (S14).

On the other hand, the second image acquisition step, the whole crown extraction step, and the crown identification step are executed as the crown identification step.

Specifically, in the second image acquisition step, the second image acquisition section 421 acquires a second aerial image of the fruit tree farm field at the time of identifying a crown at the same scale as the first aerial image (S15). Next, in the whole crown extraction step, the whole crown extraction section 422 processes the second aerial image to extract a whole crown image including the plurality of individual fruit trees (S16).

Then, in the crown identification step, the crown identification section 423 collates the crown candidate region and the centroid of the identification criterion with the whole crown image to extract a crown candidate region of each individual fruit tree (S17). This crown candidate region may be identified as the final crown region. Alternatively, for example, the crown region may be identified from the crown candidate region and the minute region as described above (S18). The crown region identified in this manner may be output (S20), or the traits of the fruit tree may be analyzed on the basis of the identified crown region (S19), and the analysis result may be output (S20).

The identification device and the identification method of the present invention can be utilized, for example, as image processing when analyzing a trait of a plant in the third example embodiment described below.

Second Example Embodiment

The program of the present example embodiment can execute the identification method of the above-described example embodiments on a computer. The program of the present example embodiment may be recorded on, for example, a computer-readable recording medium. The recording medium is not particularly limited, and examples thereof include a read-only memory (ROM), a hard disk (HD), an optical disk, and a Floppy® disk (FD).

Third Example Embodiment

The identification device and the identification method for identifying a crown of an individual fruit tree of the present invention can be utilized, for example, in the breeding data collection device and data collection method of the present example embodiment.

In breeding studies, expression typing (phenotyping) of crops is generally performed by researchers entering a farm field, dividing the farm field into sections (plots), and visually observing the plots. However, this method requires large labor for evaluation and large work cost, so that the measurement range and the measurement frequency are also limited. Therefore, for example, phenotyping is not performed in a farm field where plants are actually bred, but is performed only in a special farm field for testing or the like.

In this regard, the breeding data collection device of the present example embodiment is a new system capable of easily obtaining data for phenotyping not only in a special farm field for testing, but also in a farm field where plants are actually bred, for example.

The breeding data collection device of the present example embodiment classifies images of the farm field such as aerial images are classified on the basis of imaging altitudes reconstructs 3D image data of the farm field, the sections in the farm field, and the plants in the farm field from the classified image groups, and further convert the 3D image data to visualization data based on the farm field condition or the imaging condition, for example. Therefore, the present example embodiment can obtain, for example, visualization data of a wide area of an actual farm field, rather than a limited area of a test farm field. As a result, the visualization data can be widely used for the analysis of the actual farm field and the plants grown there, and then can be used to, for example, assist the acquisition of new knowledge on the phenotype.

Figure 10:
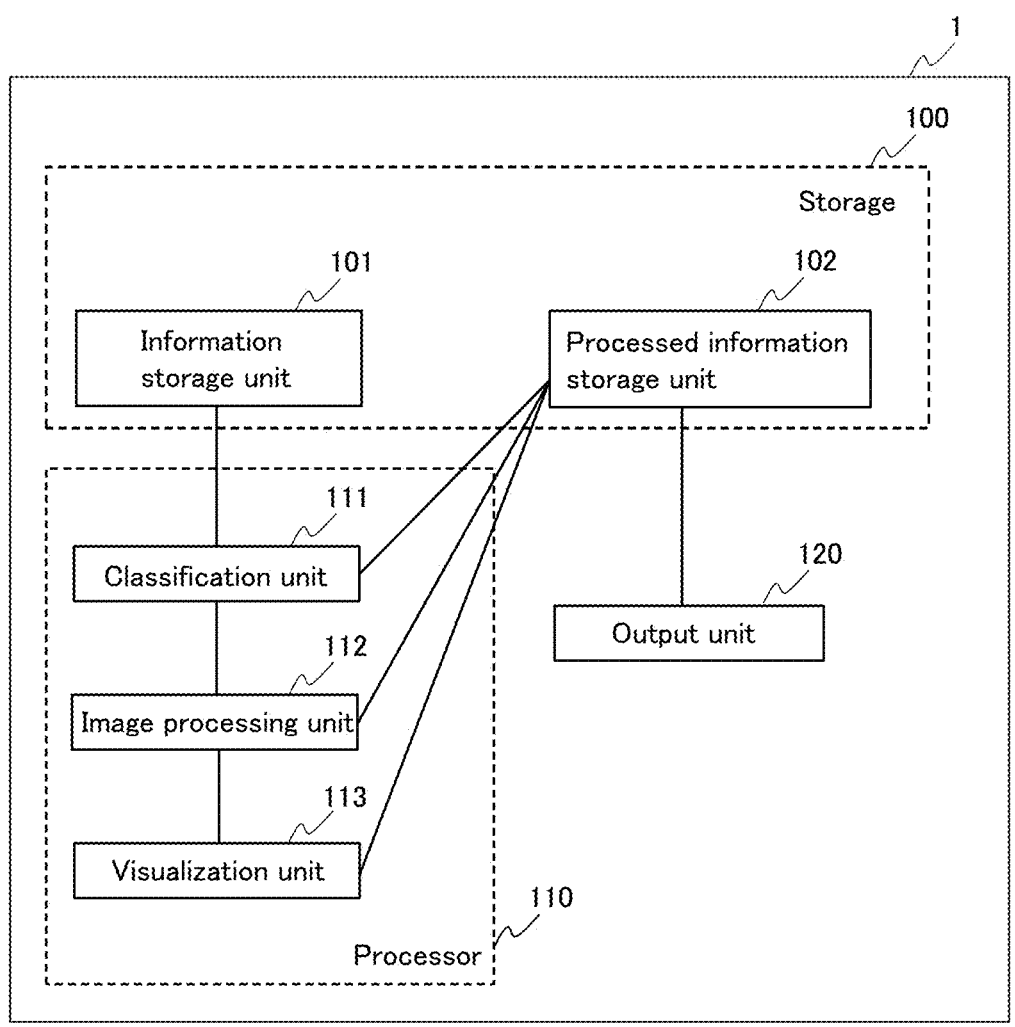
FIG. 10 is a block diagram illustrating an example of a breeding data collection device of the third example embodiment.

FIG. 10 is a block diagram illustrating an example of the configuration of a breeding data collection device 1 of the present example embodiment. The breeding data collection device 1 includes a storage 100, a processor 110, and an output unit 120. The processor 110 includes a classification unit 111, an image processing unit 112, and a visualization unit 113. The storage 100 includes an information storage unit 101 and a processed information storage unit 102.

The breeding data collection device 1 is also referred to as a breeding data collection system, for example. The breeding data collection device 1 may be, for example, one breeding data collection device including the components, or a breeding data collection device in which the components are connectable to each other via a communication network. The communication network is not particularly limited, and examples thereof are those described above.

Figure 17:
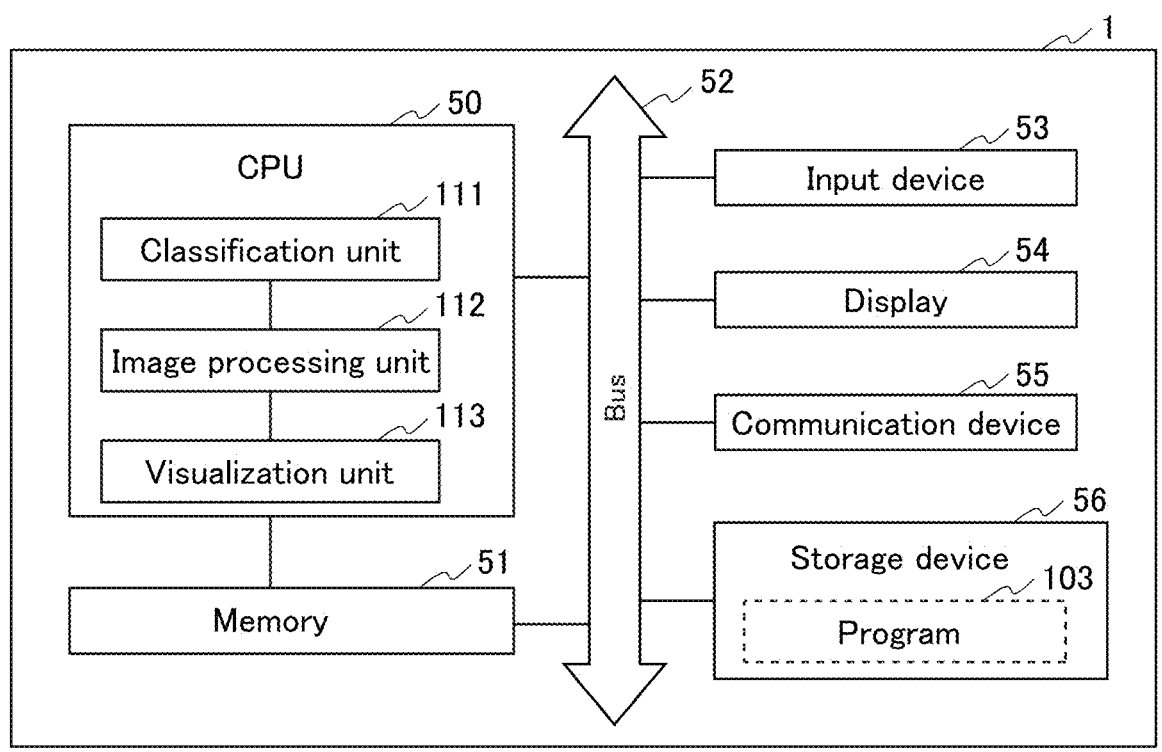
FIG. 17 is a block diagram illustrating an example of the hardware configuration of the system of the third example embodiment.

FIG. 17 is a block diagram of a hardware configuration of the breeding data collection device 1. The breeding data collection device 1 includes, for example, a CPU 50 which is a processor, a memory 51, a bus 52, an input device 53, a display 54, a communication device 55, and a storage device 56. The components of the breeding data collection device 1 are connected to each other via the bus 52 by an interface (I/F), for example.

The CPU 50 controls the breeding data collection device 1. In the breeding data collection device 1, the CPU 50 executes a program of the present invention and other programs and reads and writes various pieces of information, for example. Specifically, in the breeding data collection device 1, the CPU 50 functions as the processor 110, for example.

For example, the breeding data collection device 1 is connectable to the communication network through the communication device 55 connected to the bus 52 and is connectable to an external device via the communication network. When information is output to the external device, the communication device 55 functions as the output unit 120, for example.

The memory 51 includes, for example, a main memory, and the main memory is also referred to as a main storage device. When the CPU 50 executes processing, the memory 51 reads various kinds of operation programs 103 such as the program of the present invention stored in an auxiliary storage device to be described later, and the CPU 50 receives data from the memory 51 and executes the programs 103, for example. The main memory is, for example, the same as described above. The storage device 56 is also referred to as, for example, an auxiliary storage relative to the main memory (main storage).

The storage device 56 is, for example, the same as described above. The storage device 56 is, for example, a storage 100 and stores information input to the breeding data collection device 1, information processed in the breeding data collection device 1, and the like, for example.

The breeding data collection device 1 further includes, for example, the input device 53 and the display 54. Examples of the input device 53 include a touch panel, a mouse, and a keyboard. Examples of the display 54 include an LED display and a liquid crystal display. When information is displayed in the breeding data collection device 1, the display 54 functions as the output unit 120, for example.

Figure 11:
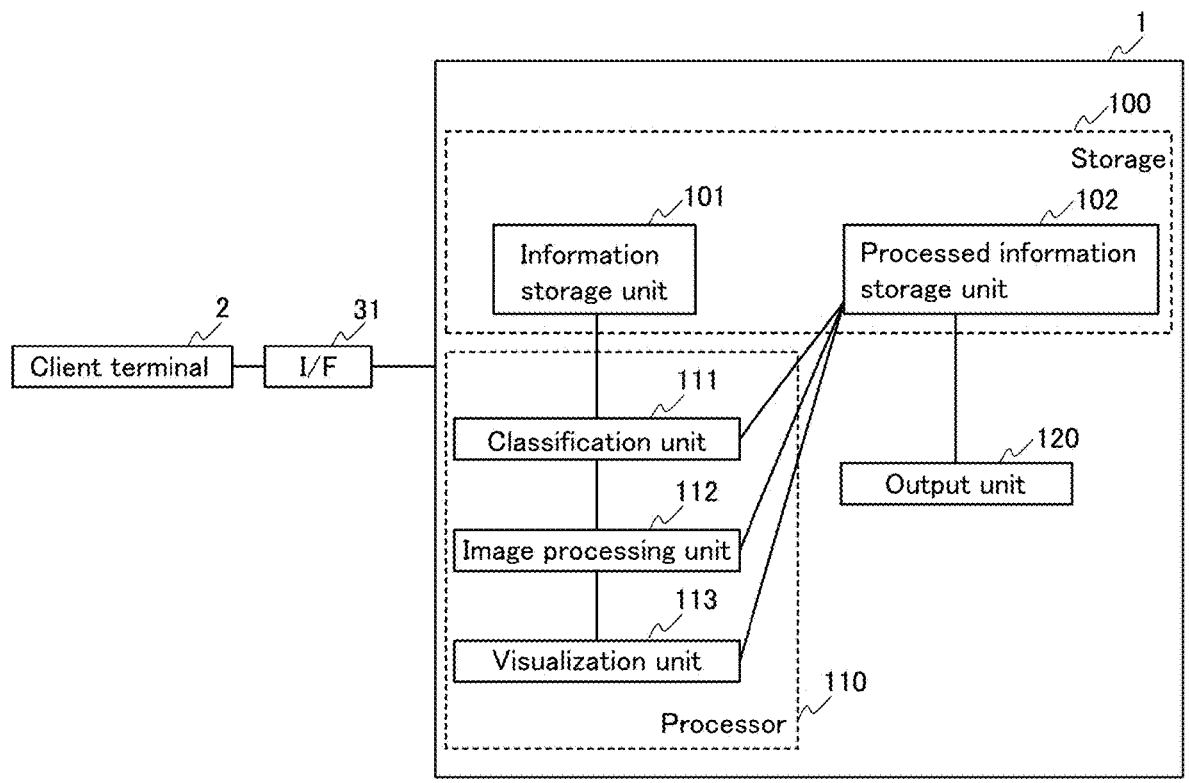
FIG. 11 is a block diagram illustrating another example of the breeding data collection device of the third example embodiment.

In the breeding data collection device 1, information to be processed is input from a client terminal 2 to the information storage unit 101 via an interface (I/F) 31, as illustrated in FIG. 11, for example. The type of the interface 31 is not particularly limited, and for example, a graphical user interface (GUI), a character user interface (CUI), an application program interface (API), or the like can be used.

Figure 12:
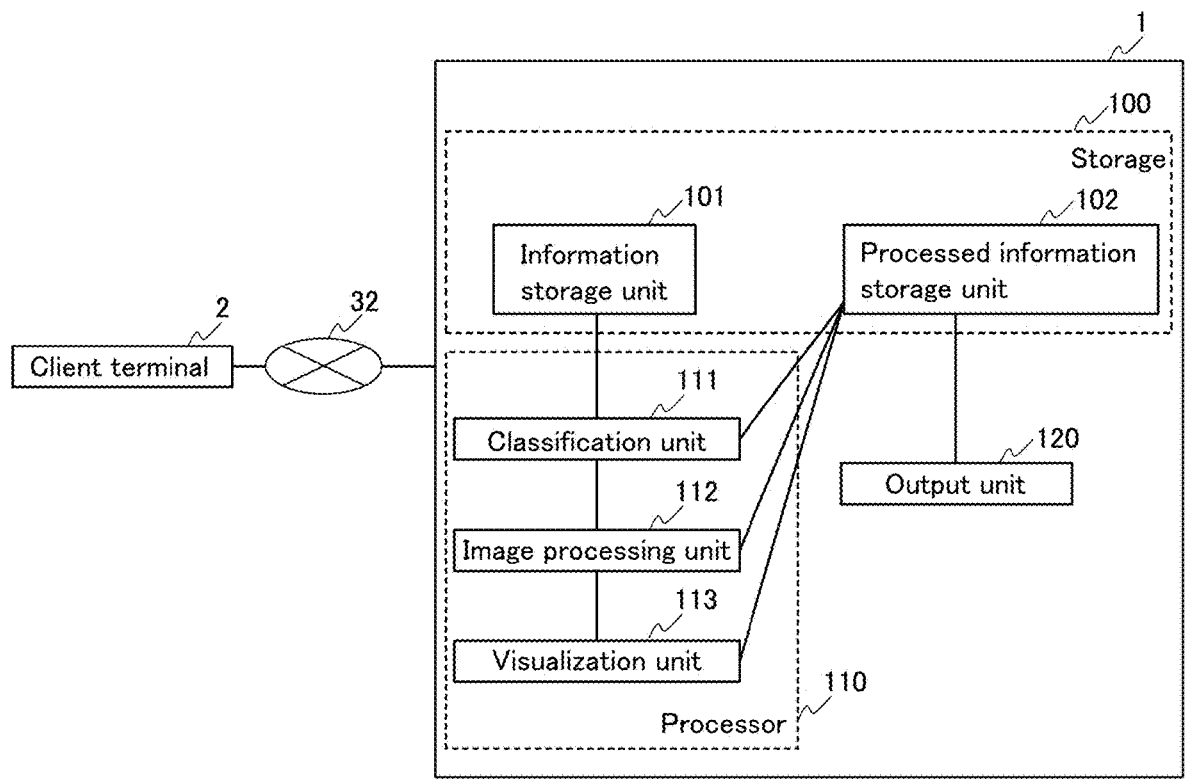
FIG. 12 is a block diagram illustrating yet another example of the breeding data collection device of the third example embodiment.

The breeding data collection device 1 may be connected to the client terminal 2 via the communication network 32, for example, as illustrated in FIG. 12. The communication network is not particularly limited, and a known communication network can be used. The communication network may be, for example, a wired network or a wireless network, and specific examples thereof include an Internet line, a telephone line, and a local area network (LAN).

As described above, the information storage unit 101 stores farm field information, an imaging condition including a flight log of aerial imaging, and aerial images of the farm field linked with the imaging condition.

The farm field information is not particularly limited and examples thereof include map information on the farm field, information on each section (plot) dividing the farm field, information on plants bred in the farm field, and visual observation information. The information on each section in the farm field is, for example, position information on each section obtained by dividing the field into a plurality of sections, specifically, coordinates and the like. The visual observation information is, for example, actual measurement information on plants in the farm field.

The image of the farm field includes an aerial image of the farm field. As described above, when a researcher actually enters a farm field and observes a plant, the researcher may perform ground imaging using a camera in addition to visual observation and use the ground image to evaluate the phenotype. However, when a researcher performs ground imaging of the farm field, the labor is large and the measurement range and the measurement frequency are limited, similarly to the visual observation. In contrast, since the aerial image can be obtained by an unmanned aerial vehicle such as a drone, for example, an image of a wide area can be easily obtained regardless of the size of the farm field, and images over time can be easily obtained. Therefore, the present example embodiment can conduct high-speed phenotyping using the aerial image. The image may further include, for example, a ground image.

The imaging condition includes an imaging altitude and further includes, for example, an imaging date and time. Further, as described above, for the aerial image, the imaging condition includes, for example, a flight log of an unmanned aerial vehicle that performs imaging. The flight log includes, for example, a flight condition of the unmanned aerial vehicle used for imaging. The flight condition includes, for example, a flight route, a flight speed, flight time, imaging date and time associated with flight, and an imaging time.

The classification unit 111 classifies, as mentioned above, the aerial images into a plurality of image groups having different imaging altitude ranges on the basis of an imaging altitude included in the imaging condition. By classifying the aerial images on the basis of the imaging altitude, suitable aerial images can be used, for example, for the creation of image-processed data of the entire farm field, sections of the farm field, and plant groups in the farm field or the sections in the processing by the image processing unit 112 to be described later. The imaging altitude range is not particularly limited and can be any range.

The number of image groups into which the aerial images are classified on the basis of the imaging altitude range is not particularly limited, and is preferably two or more. As a specific example, in the case of classifying into two image groups, for example, a first image group can be set to an image group in which the imaging altitude is higher than that of a second image group. The imaging altitude of each image group is not particularly limited, and for example, the following specific example can be given. If the image-processed data for the entire farm field is created by the image processing unit to be described later, the first image group includes, for example, aerial images, the imaging altitude is, for example, about 100 m from the ground, and the imaging area is about 5 ha. If the image-processed data for the plant groups in a section of the farm field is created by the image processing unit, the second image group includes, for example, aerial images, and the imaging altitude is, for example, about 30 m from the ground, and the imaging area is about 0.5 ha. In the case of the aerial imaging, for example, the imaging area can be calculated from the type of the image sensor mounted on the unmanned aerial vehicle, the focal length, the vertical hovering accuracy of the unmanned aerial vehicle, and the like.

The image processing unit 112 first creates at least one image-processed data selected from the group consisting of a two-dimensional orthomosaic, a numerical surface model, and a point cloud from at least one of the plurality of image groups and the imaging condition. The two-dimensional orthomosaic is also referred to as, for example, an orthographic projection image. The numerical surface model is also referred to as a digital surface model (DSM). The point cloud is also referred to as, for example, a point group or three-dimensional reconstruction data. The image-processed data can be used for visualization of two-dimensional data, visualization of three-dimensional data (reconstruction into 3D image data), and the like on the farm field, the sections of the farm field, or the plants in the farm field, as will be described later.

Then, the image processing unit 112 analyzes traits of plants in the farm field from the image-processed data to obtain trait analysis data.

The creation of the image processing and the analysis of the traits using the plurality of images included in the image group are not particularly limited, and can be performed using, for example, existing software. In the breeding data collection device 1 of the present example embodiment, for example, the software may be installed in the processor 110.

Figure 13:
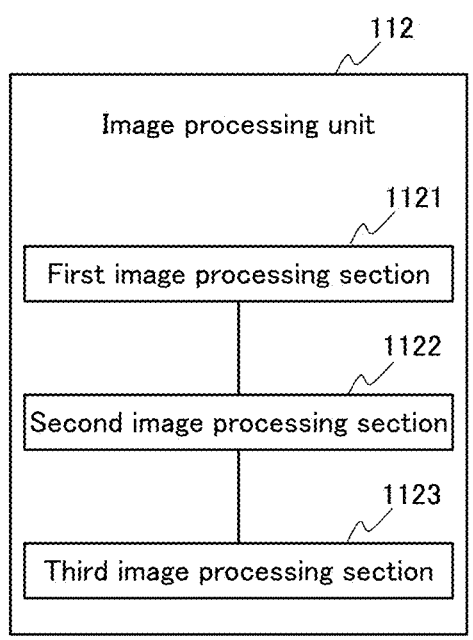
FIG. 13 is a block diagram illustrating an example of an image processing unit in the breeding data collection device of the third example embodiment.

The image processing unit 112 may include, for example, a plurality of image processing units. As a specific example, FIG. 13 shows a configuration including a first image processing section 1121, a second image processing section 1122, and a third image processing section 1123. In the present example embodiment, for example, the first image processing section 1121 creates image-processed data on the entire farm field (for example, reconstruction of a 3D image of the entire farm field), and the second image processing section 1122 creates image-processed data on sections of the farm field, specifically, a plant group in each section of the farm field (for example, reconstruction of a 3D image of each section of the farm field). The third image processing section 1123 can be used for, for example, creation of any image-processed data.

When the image processing unit 112 performs a plurality of kinds of image processing as shown in FIG. 13, for example, the kinds of image processing may be performed by pipelining.

The first image processing section 1121 creates the image-processed data from a plurality of images (preferably aerial images) in the first image group, for example. Specifically, for example, the plurality of images may be aligned to reconstruct a 3D image of the entire farm field. At this time, for example, the 3D image of the entire farm field may be reconstructed by aligning and trimming the images on the basis of the farm field information, the imaging information on the images, and the like. The first image processing section 1121 may further analyze traits of the plants in the entire farm field, for example, from the image-processed data. The traits may be, for example, the plant coverage rate, the plant height, the plant growth rate, and the like in the farm field and may include the condition of the farm field.

The second image processing section 1122 creates the image-processed data from a plurality of images (preferably aerial images) in the second image group, for example. Specifically, for example, the plurality of images may be aligned to reconstruct a 3D image of a section of the farm field. The second image processing section 1122 may further analyze traits of the plants in the section of the farm field, for example, from the image-processed data on the basis of the farm field information, the imaging information on the images, and the like. The traits may be the same as described above and are, for example, the plant coverage rate, the plant height, the plant growth rate, and the like in any area (any section).

The third image processing section 1123 creates any image-processed data from a plurality of images (preferably ground images) in any image group, for example. Specifically, for example, a 3D image of plants in the farm field can be reconstructed from the plurality of images.

The visualization unit 113 visualizes data obtained in the image processing unit 112. The data obtained in the image processing unit 112 is, for example, the image-processed data and trait analysis data on the traits. The visualization unit 113 visualizes the data on the basis of, for example, at least one of the farm field condition or the imaging condition. The 3D image data of the entire farm field can be linked with the map data of the farm field to visualize or may be linked with an imaging time to visualize, for example. The 3D image data of the entire farm field and the map data of the farm field can be aligned by software relating to geographic information such as QGIS, for example. Accordingly, the visualization can be performed in a time-sequential manner by being further linked with the imaging time. Hereinafter, the data used in the visualization unit 113 is referred to as visualization data, and the data obtained in the visualization unit 113 is referred to as processed data.

The processed information storage unit 102 stores data obtained in the image processing unit 112 (for example, image-processed data and trait analysis data) and processed data obtained in the visualization unit 113. The processed information storage unit 102 may further store classification data in the classification unit 111, for example.

The output unit 120 output at least one of the data obtained in the image processing unit 112 or the data obtained in the visualization unit 113. The output unit 120 may output the data to a client terminal or a display screen, for example. The output from the breeding data collection device 1 to the outside may be output via an interface, for example.

Figure 14:
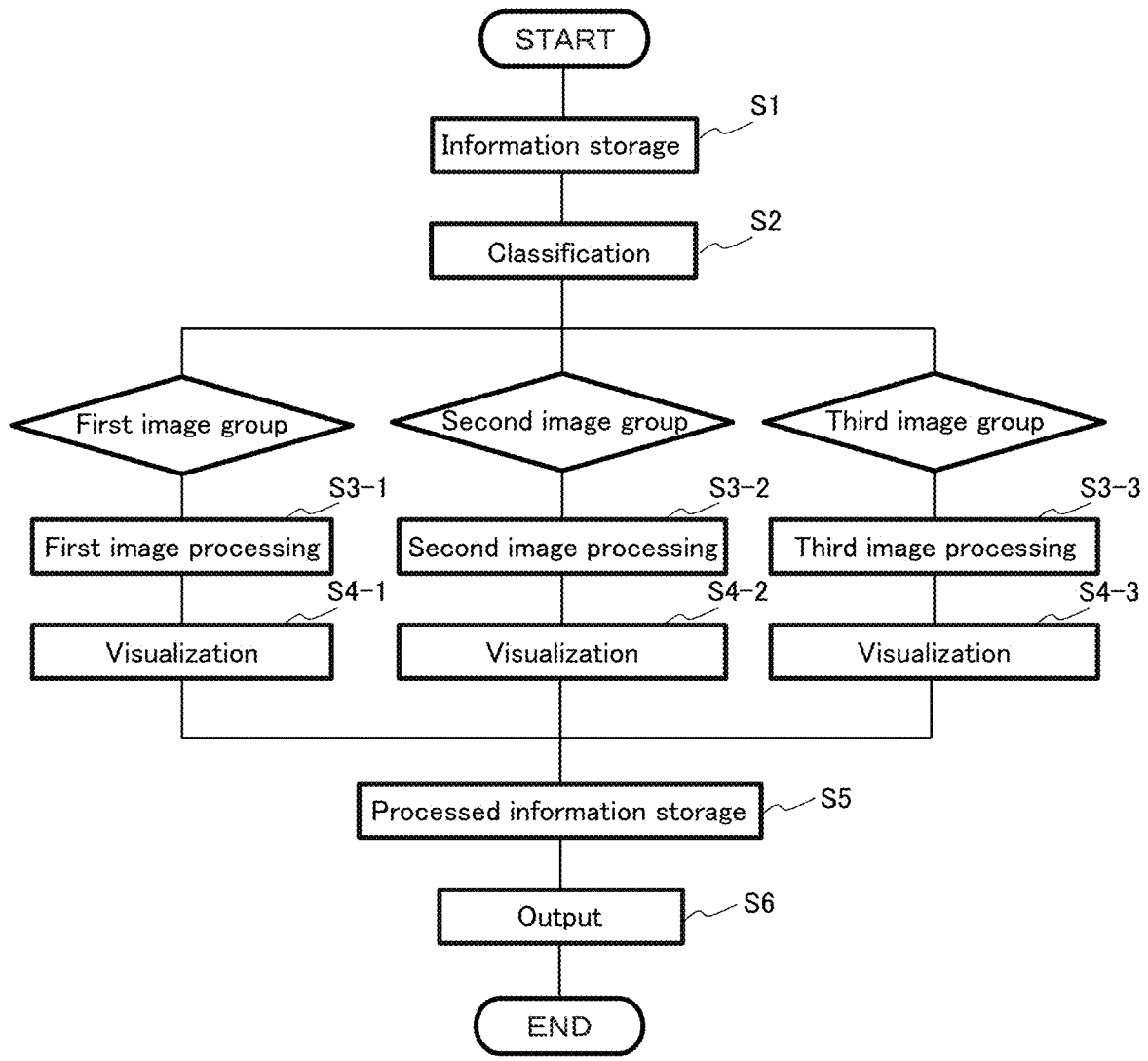
FIG. 14 is a flowchart illustrating an example of a method of the third example embodiment.

Next, a method for collecting breeding data (hereinafter also referred to as the breeding data collection method) of the present example embodiment is described below as an example with reference to the flowchart of FIG. 14.

The breeding data collection method of the present example embodiment is performed as follows using the breeding data collection device 1 of the present example embodiment illustrated in FIG. 10, for example. The breeding data collection method of the present example embodiment is not limited to the breeding data collection device 1 of FIG. 10.

First, in an information storage step (S1), farm field information, an imaging condition including a flight log of aerial imaging, and aerial images of the farm field linked with the imaging condition are stored. Next, in a classification step (S2), the aerial images are classified into a plurality of image groups having different imaging altitude ranges on the basis of an imaging altitude included in the imaging condition.

Then, in an image processing step (S3), at least one image-processed data selected from the group consisting of a two-dimensional orthomosaic, a numerical surface model, and a point cloud is created from at least one of the plurality of image groups and the imaging condition, and a trait of a plant in the farm field is analyzed from the image-processed data. In the present example embodiment, a case in which the images are classified into three image groups (first, second, and third image groups) will be described as an example. In the first image processing step (S3-1), a 3D image of the entire farm field is reconstructed from the first image group. In the second image processing step (S3-2), a 3D image of a section of the farm field is reconstructed from the second image group to analyze traits of the plant group in the section of the farm field. The third image processing step (S3-3) is optional, and for example, an optionally selected image processing of an optionally selected image group is performed.

Next, in the visualization step (S4), the obtained image-processed data are visualized. Specifically, in a first visualization step (S4-1), the image-processed data obtained in the first image processing step (S3-1) is visualized, in a second visualization step (S4-2), the image-processed data obtained in the second image processing step (S3-2) is visualized, and in the third visualization step (S4-3), the image-processed data obtained in the third image processing step (S3-3) is visualized.

Then, in a processed information storage step (S5), data obtained in the image processing unit 112 and data obtained in the visualization unit 113 are stored as processed information, and in an output step (S6), at least one of the data obtained in the image processing unit 112 or the data obtained in the visualization unit 113 is output.

The identification method of identifying a crown of an individual fruit tree of the first example embodiment can be used from the acquisition of an aerial image (for example, the step (S1)) to the image processing for analyzing a trait (for example, the step (S3)) in the breeding data collection method of the present example embodiment. In the present example embodiment, as described above, aerial images are acquired (step (S1)) and classified into image groups (step (S2)), the image-processed data is created from the classified image groups, and traits of plants in the farm field are analyzed from the image-processed data (step (S3)). Therefore, in the case in which the breeding data of the fruit trees in the fruit tree farm field is collected, for example, the image-processed data is created (for example, the 3D image is reconstructed) from the aerial images of the fruit tree farm field. Then, as shown in the first example embodiment, for example, the extraction of skeletons to the extraction of the identification criterion are performed from this image-processed data of the first images. On the other hand, as shown in the first example embodiment, for example, the extraction of the whole crown image to the identification of the crown region are performed from this image-processed data of the second images. Accordingly, traits of plants (i.e., fruit trees) can be analyzed as shown in the present example embodiment by analyzing the traits of the identified crown region.

(Variation 1)

In the breeding data collection device 1 of the third example embodiment, for example, the information storage unit 101 may further store sensing data of the farm field linked with position information on sensing in the farm field. The sensing data is not particularly limited, and examples thereof includes a temperature, a humidity, a carbon dioxide level, and an amount of solar radiation (for example, a photosynthetic photon flux density).

In the breeding data collection device 1, the visualization unit 113 further visualizes the sensing data in the farm field linked with the position information on the sensing on the basis of the farm field information. The data obtained in the visualization unit 113 is, for example, graph data.

The present example embodiment can efficiently design a drone flight path in imaging of the farm field, set an imaging condition of images, acquire phenotyping data, manage sensing data relating to an environment of the farm field, and the like by using the processed data obtained in the visualization unit 113, for example. Thus, for example, the present invention is also useful for high-speed phenotyping.

In addition, the breeding data collection device 1 of the present example embodiment can be a platform. Thus, the present invention can be integrated with various other data, for example.

When a researcher directly collects data in the farm field, an objective or quantitative evaluate of the data may be difficult because it depends on the experience and intuition of researchers. In addition, the data is collected by a researcher's own method, and it is difficult to share the method. In contrast, the present example embodiment can bring images and the like collected under individualistic conditions by various researchers to be stored in the information storage unit, for example. These images can be classified on the basis of the imaging altitude and then can be processed and visualized. Therefore, not only information obtained by individuals but also images collected under different conditions by various researchers and processed information obtained therefrom can be accumulated, which leads to more efficient support for discovery of new findings.

Fourth Example Embodiment

Figure 15:
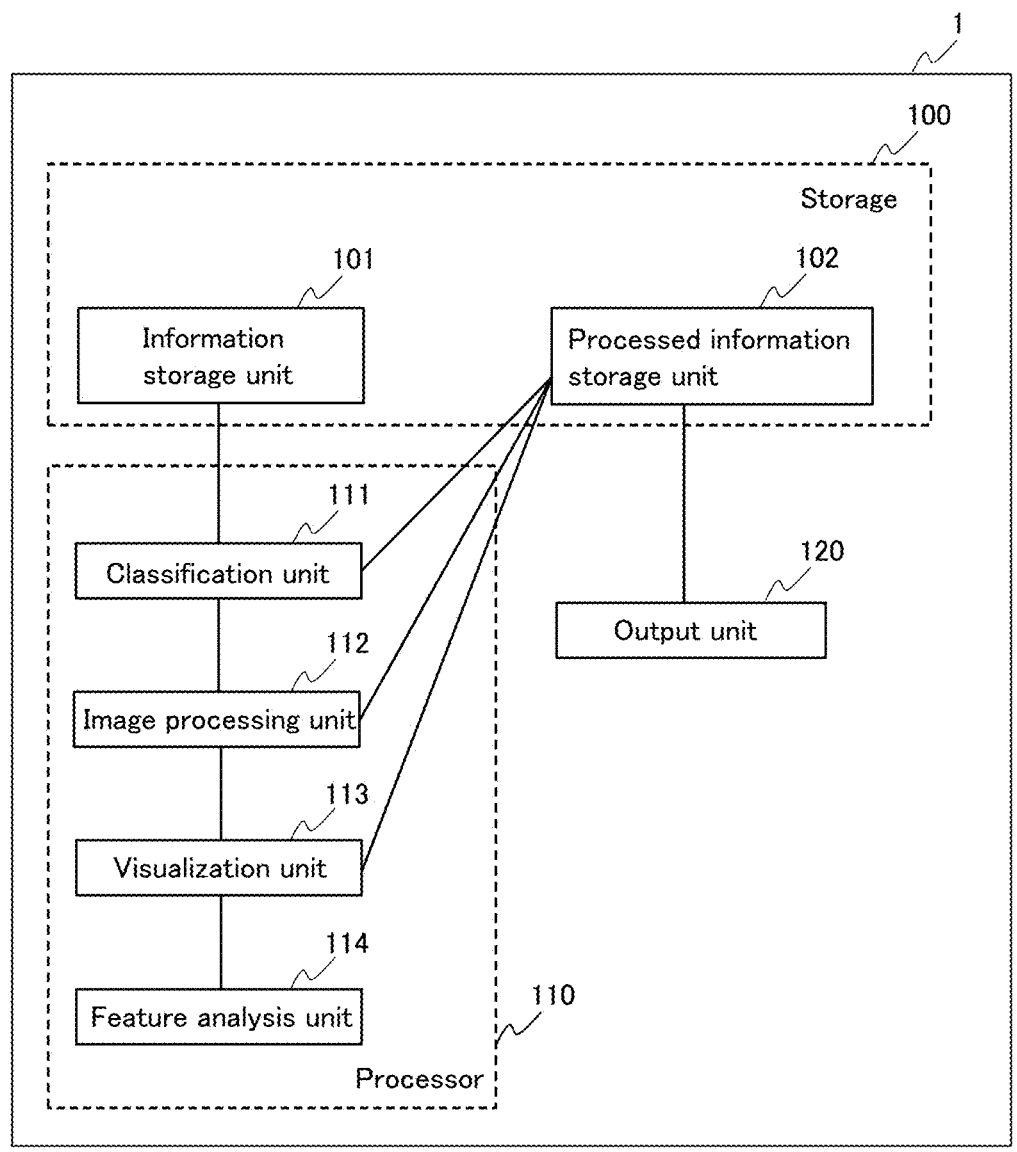
FIG. 15 is a block diagram illustrating an example of the breeding data collection device of the fourth example embodiment.

FIG. 15 is a block diagram illustrating another example of the breeding data collection device of the third example embodiment. In FIG. 15, a breeding data collection device 6 further includes a feature analysis unit 114. The feature analysis unit 114 is included, for example, in the processor 110. The breeding data collection device of the present example embodiment can also be referred to as, for example, a feature analysis device or a feature analysis system.

The feature analysis unit 114 analyzes visualized data to extract features of the farm field or the plant. As the visualization data, for example, various data can be used, and specific examples thereof include the feature amount of the image, created data, trait analysis data, sensing data, and the like. The extraction of the features is not particularly limited, and can be extracted from outliers using, for example, SVM or the like.

Fifth Example Embodiment

Figure 16A:
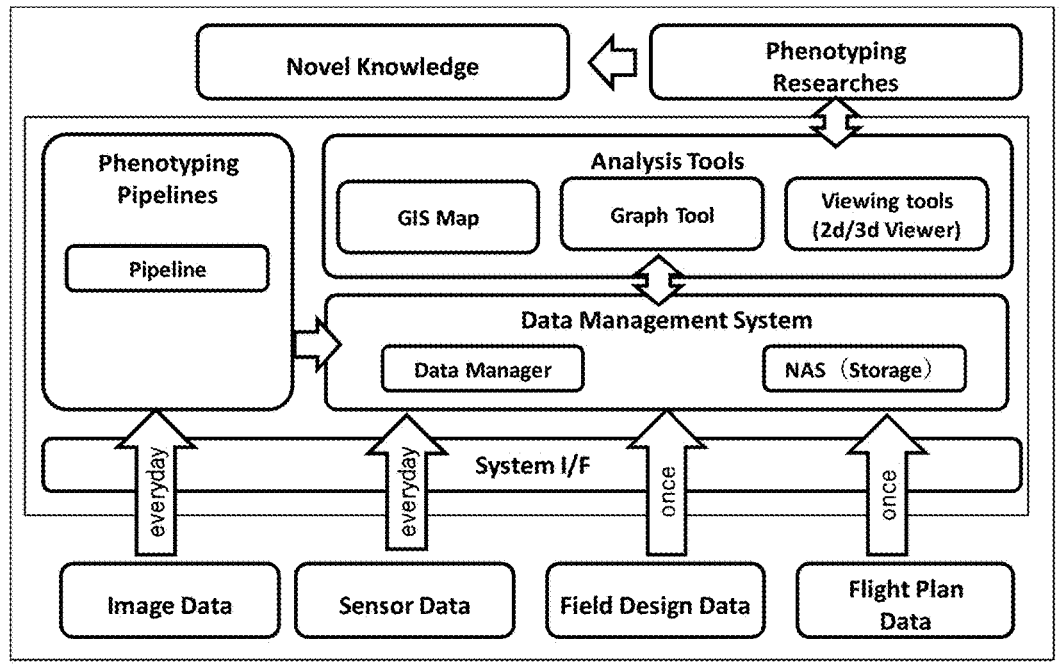
FIGS. 16A and 16B are schematic views illustrating an example of a system of the fifth example embodiment.
Figure 16B:
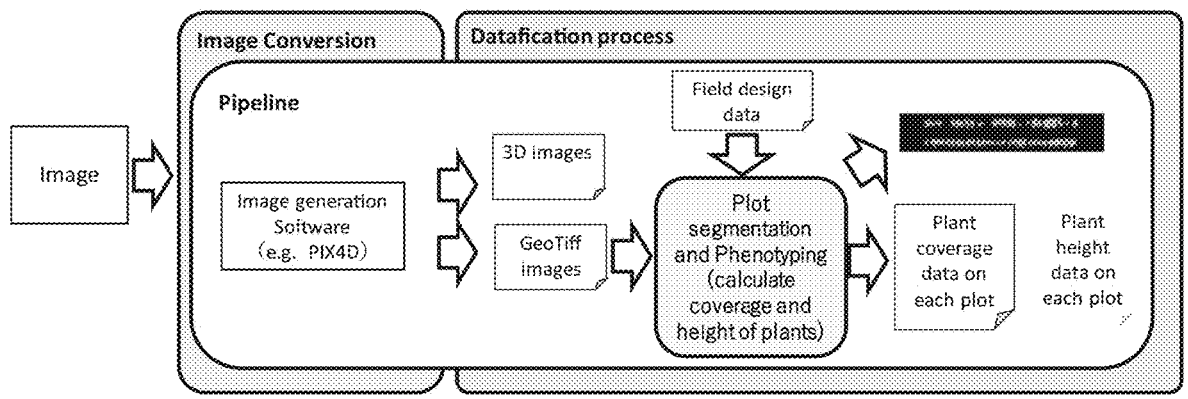

FIGS. 16A and 16B are schematic views illustrating another example of the breeding data collection device of the third example embodiment. FIG. 16A is an example of an overview of the breeding data collection device 1 of the present example embodiment. FIG. 16B is an example of an image processing unit in the breeding data collection device 1. The present invention is not limited thereto.

Sixth Example Embodiment

The program of the present example embodiment can execute the breeding data collection method or the feature analysis method of the third or fourth example embodiment on a computer. The program of the present example embodiment may be recorded on, for example, a computer-readable recording medium. The recording medium is not particularly limited, and examples thereof include a read-only memory (ROM), a hard disk (HD), an optical disk, and a Floppy® disk (FD).

While the present invention has been described above with reference to illustrative example embodiments, the present invention is by no means limited thereto. Various changes and variations that may become apparent to those skilled in the art may be made in the configuration and specifics of the present invention without departing from the scope of the present invention.

(Supplementary Notes)

Some or all of the above example embodiments and examples may be described as in the following Supplementary Notes, but are not limited thereto.

(Supplementary Note A1)

An identification device for identifying a crown of an individual fruit tree in an image, the identification device including:
  an identification criterion determination unit; and
  a crown identification unit,
  the identification criterion determination unit including
    a first image acquisition section that acquires a first aerial image including a plurality of individual fruit trees in a deciduous period in a fruit farm field,
    a skeleton extraction section that processes the first aerial image to extract a whole crown skeleton including the plurality of individual fruit trees,
    a vertex extraction unit that extracts vertexes of each crown skeleton corresponding to each individual fruit tree, and
    an identification criterion extraction section that extracts a crown candidate region of a minimum polygonal shape including all the vertexes as an identification criterion for each individual fruit tree and extracts a centroid of the crown candidate region,
  the crown identification unit including
    a second image acquisition section that acquires a second aerial image of the fruit tree farm field at the time of identifying a crown at the same scale as the first aerial image,
    a whole crown extraction section that processes the second aerial image to extract a whole crown image including the plurality of individual fruit trees, and
    a crown identification section that collates the crown candidate region and the centroid of the identification criterion with the whole crown image to identify a crown region of each individual fruit tree in the second aerial image.

(Supplementary Note A2)

The identification device according to Supplementary Note A1, wherein the crown identification unit collates the crown candidate region and the centroid as the identification criterion with the whole crown image to extract a crown candidate region of each individual fruit tree, and identifies the crown region of each individual fruit tree from the crown candidate region and a minute region surrounding the crown candidate region.

(Supplementary Note A3)

The identification device according to Supplementary Note A1 or A2 further including a fruit tree trait analysis unit that analyzes a trait of an identified crown region.

(Supplementary Note A4)

The identification device according to any one of Supplementary Notes A1 to A3, further including an output unit that outputs the crown region.

(Supplementary Note A5)

An identification method for identifying crowns of a plurality of individual fruit trees in an image, the identification method including:
  an identification criterion determination step; and
  a crown identification step,
  the identification criterion determination step including:
    a first image acquisition step of acquiring a first aerial image including a plurality of individual fruit trees in a deciduous period in a fruit farm field, a skeleton extraction step of processing the first aerial image to extract a whole crown skeleton including the plurality of individual fruit trees, a vertex extraction step of extracting vertexes of each crown skeleton corresponding to each individual fruit tree; and an identification criterion extraction step of extracting a crown candidate region of a minimum polygonal shape including all the vertexes as an identification criterion for each individual fruit tree and extracting a centroid of the crown candidate region, the crown identification step including:

a second image acquisition step of acquiring a second aerial image of the fruit tree farm field at the time of identifying a crown at the same scale as the first aerial image;

a whole crown extraction step of processing the second aerial image to extract a whole crown image including the plurality of individual fruit trees, and a crown identification step of collating the crown candidate region and the centroid of the identification criterion with the whole crown image to identify a crown region of each individual fruit tree in the second aerial image.

(Supplementary Note A6)
The identification method according to Supplementary Note A5, wherein
in the crown identification step,
the crown region and the centroid as the identification criterion are collated with the whole crown image to identify a crown candidate region of each individual fruit tree, and
the crown region of each individual fruit tree is identified from the crown candidate region and a minute region surrounding the crown candidate region.

(Supplementary Note A7)
The identification method according to Supplementary Note A5 or A6 further including a fruit tree trait analysis step of analyzing a trait of an identified crown region.

(Supplementary Note A8)
The identification method according to any one of Supplementary Notes A5 to A7, further including an output step of outputting the crown region.

(Supplementary Note A9)
A program for a computer to execute the identification method according to any one of Supplementary Notes A5 to A8.

(Supplementary Note A10)
A computer readable recording medium with the program according to Supplementary Note A9.

Some or all of the third to sixth example embodiments and examples may be described as in the following Supplementary Notes, but are not limited thereto.

(Supplementary Note B1)
A breeding data collection device for collecting breeding data in a farm field, the breeding data collection device including:

an information storage unit that stores farm field information, an imaging condition including a flight log of aerial imaging, and aerial images of the farm field linked with the imaging condition;

a classification unit that classifies the aerial images into a plurality of image groups having different imaging altitude ranges on the basis of an imaging altitude included in the imaging condition;

an image processing unit that creates at least one image-processed data selected from the group consisting of a two-dimensional orthomosaic, a numerical surface model, and a point cloud from at least one of the plurality of image groups and the imaging condition and analyzes a trait of a plant in the farm field from the image-processed data;

a visualization unit that visualizes the image-processed data obtained in the image processing unit;

a processed information storage unit that stores, as processing information, the data obtained in the image processing unit and the data obtained in the visualization unit; and an output unit that outputs at least one of the data obtained in the image processing unit or the data obtained in the visualization unit.

(Supplementary Note B2)
The breeding data collection device according to Supplementary Note B 1, wherein
the plurality of image groups at least includes a first image group and a second image group, and
the first image group has a higher imaging altitude range than the second image group.

(Supplementary Note B3)
The breeding data collection device according to Supplementary Note B1 or B2, wherein the image processing unit reconstructs a 3D image of the entire farm field.

(Supplementary Note B4)
The breeding data collection device according to any one of Supplementary Notes B1 to B3, wherein the image processing unit reconstructs a 3D image of a section of the farm field to determine a growth condition of a plant group in the section.

(Supplementary Note B5)
The breeding data collection device according to any one of Supplementary Notes B1 to B4, wherein the trait is at least one selected from the group consisting of a plant coverage rate, a plant height, and a plant growth rate in the farm field.

(Supplementary Note B6)
The breeding data collection device according to any one of Supplementary Notes B1 to B5, wherein the image processing unit reconstructs a 3D image of the plant to determine a trait of the plant in further detail.

(Supplementary Note B7)
The breeding data collection device according to any one of Supplementary Notes B1 to B6, wherein
the image processing unit includes
a first image processing section that processes the first image group; and
a second image processing section that processes the second image group.

(Supplementary Note B8)
The breeding data collection device according to Supplementary Note B7, wherein the image processing unit executes a plurality of image processes by pipelining.

(Supplementary Note B9)
The breeding data collection device according to any one of Supplementary Notes B1 to B8, wherein
the visualization unit visualizes two-dimensional data and three-dimensional data included in the data obtained in the image processing unit.

(Supplementary Note B10)
The breeding data collection device according to Supplementary Note B9, wherein
the two-dimensional data includes data of a two-dimensional orthomosaic, a numerical surface model, and a graph, and
the three-dimensional data includes data of a point cloud.

(Supplementary Note B11)
The breeding data collection device according to any one of Supplementary Notes B1 to B10, wherein
the imaging condition includes an imaging time, and
the visualization unit executes a visualization in a time-sequential manner.

(Supplementary Note B12)
The breeding data collection device according to any one of Supplementary Notes B1 to B11, wherein
the information storage unit further stores sensing data of the farm field linked with position information on sensing in the farm field.

(Supplementary Note B13)
The breeding data collection device according to Supplementary Note B12, wherein
the visualization unit further visualizes the sensing data in the farm field linked with the position information on the sensing on the basis of the farm field information.

(Supplementary Note B14)
The breeding data collection device according to Supplementary Note B13, wherein the visualization unit obtains graph data.

(Supplementary Note B15)
The breeding data collection device according to Supplementary Note B13 or B14, wherein the sensing data is at least one data selected from the group consisting of a temperature, a humidity, a carbon dioxide level, and an amount of solar radiation.

(Supplementary Note B16)
The breeding data collection device according to any one of Supplementary Notes B1 to B15, wherein the farm field information includes coordinate information on each plot dividing the farm field and plant information on a plant growing in the farm field, and the plant information is linked with the coordinate information.

(Supplementary Note B17)
The breeding data collection device according to Supplementary Note B16, wherein the plant information is image analysis information on the plant.

(Supplementary Note B18)
The breeding data collection device according to any one of Supplementary Notes B1 to B17, wherein the information storage unit further stores an imaging condition and a ground image linked with the imaging condition.

(Supplementary Note B19)
The breeding data collection device according to any one of Supplementary Notes B1 to B18, wherein the aerial image is an image obtained by an unmanned aerial vehicle.

(Supplementary Note B20)
The breeding data collection device according to Supplementary Note B19, wherein the unmanned aerial vehicle is a drone.

(Supplementary Note B21)
The breeding data collection device according to any one of Supplementary Notes B1 to B20, further including:
a feature analysis unit that analyzes visualization data to extract a feature of the farm field or the plant, wherein
the visualization data is at least one selected from the group consisting of a feature quantity of each image, created data, trait analysis data, and sensing data.

(Supplementary Note B22)
A breeding feature analysis device for analyzing a feature in breeding, the breeding feature analysis device being connectable to the breeding data collection device according to any one of Supplementary Notes B1 to B21 via a communication network and including:
an input unit that inputs the visualization data of the device; and
a feature analysis unit that analyzes the visualization data and extracts a feature of the farm field or the plant.

(Supplementary Note B23)
A breeding data collection method for collecting breeding data of a farm field, the breeding data collection method including:
an information storage step of storing farm field information, an imaging condition including a flight log of aerial imaging, and aerial images of the farm field linked with the imaging condition;
a classification step of classifying the aerial images into a plurality of image groups having different imaging altitude ranges on the basis of an imaging altitude included in the imaging condition;
an image processing step of creating at least one image-processed data selected from the group consisting of a two-dimensional orthomosaic, a numerical surface model, and a point cloud from at least one image group of the plurality of image groups and the imaging condition and analyzing a trait of a plant in the farm field from the image-processed data;
a visualization step of visualizing the image-processed data obtained in the image processing step;
a processed information storage step of storing, as processing information, the data obtained in the image processing step and the data obtained in the visualization step; and
an output step of outputting at least one of the data obtained in the image processing step or the data obtained in the visualization step.

(Supplementary Note B24)
The breeding data collection method according to Supplementary Note B23, wherein
the plurality of image groups at least includes a first image group and a second image group, and
the first image group has a higher imaging altitude range than the second image group.

(Supplementary Note B25)
The breeding data collection method according to Supplementary Note B23 or B24, wherein a 3D image of the entire farm field is reconstructed in the image processing step.

(Supplementary Note B26)
The breeding data collection method according to any one of Supplementary Notes B23 to B25, wherein a 3D image of a section of the farm field is reconstructed to determine a growth condition of a plant group in the section in the image processing step.

(Supplementary Note B27)
The breeding data collection method according to any one of Supplementary Notes B23 to B26, wherein the trait is at least one selected from the group consisting of a plant coverage rate, a plant height, and a plant growth rate in the farm field.

(Supplementary Note B28)
The breeding data collection method according to any one of Supplementary Notes B23 to B27, wherein in the image processing step, a 3D image of the plant is reconstructed to determine a growth condition of the plant in further detail.

(Supplementary Note B29)
The breeding data collection method according to any one of Supplementary Notes B23 to B28, wherein
the image processing step includes
a first image processing step of processing the first image group; and
a second image processing step of processing the second image group.

(Supplementary Note B30)
The breeding data collection method according to Supplementary Note B29, wherein in the image processing step, a plurality of image processes are executed by pipelining.
(Supplementary Note B31)
The breeding data collection method according to any one of Supplementary Notes B23 to B30, wherein in the visualization step, two-dimensional data and three-dimensional data included in data obtained in the image processing step are visualized.
(Supplementary Note B32)
The breeding data collection method according to Supplementary Note B31, wherein
the two-dimensional data includes data of a two-dimensional orthomosaic, a numerical surface model, and a graph, and
the three-dimensional data includes data of a point cloud.
(Supplementary Note B33)
The breeding data collection method according to any one of Supplementary Notes B23 to B32, wherein
the imaging condition includes an imaging time, and
in the visualization step, a visualization is executed in a time-sequential manner.
(Supplementary Note B34)
The breeding data collection method according to any one of Supplementary Notes B23 to B33, wherein in the information storage step, sensing data of the farm field linked with position information on sensing in the farm field is further stored.
(Supplementary Note B35)
The breeding data collection method according to Supplementary Note B34, wherein in the visualization step, the sensing data in the farm field linked with the position information on the sensing is further visualized on the basis of the farm field information.
(Supplementary Note B36)
The breeding data collection method according to Supplementary Note B35, wherein data obtained in the visualization step is graph data.
(Supplementary Note B37)
The breeding data collection method according to Supplementary Note B35 or B36, wherein the sensing data is at least one data selected from the group consisting of a temperature, a humidity, a carbon dioxide level, and an amount of solar radiation.
(Supplementary Note B38)
The breeding data collection method according to any one of Supplementary Notes B23 to B37, wherein the farm field information includes coordinate information on each plot dividing the farm field and plant information on a plant growing in the farm field, and the plant information is linked with the coordinate information.
(Supplementary Note B39)
The breeding data collection method according to Supplementary Note B38, wherein the plant information is image analysis information on the plant.
(Supplementary Note B40)
The breeding data collection method according to any one of Supplementary Notes B23 to B39, wherein in the information storage step, an imaging condition and a ground image linked with the imaging condition are stored.
(Supplementary Note B41)
The breeding data collection method according to any one of Supplementary Notes B23 to B40, wherein the aerial image is an image obtained by an unmanned aerial vehicle.
(Supplementary Note B42)
The breeding data collection method according to Supplementary Note B41, wherein the unmanned aerial vehicle is a drone.
(Supplementary Note B43)
The breeding data collection method according to any one of Supplementary Notes B23 to B42, further including:
a feature analysis step of analyzing visualization data to extract a feature of the farm field or the plant, wherein
the visualization data is at least one selected from the group consisting of a feature quantity of each image, created data, trait analysis data, and sensing data.
(Supplementary Note B44)
A breeding feature analysis method for analyzing a feature in breeding, the breeding feature analysis method including:
a data collection step using the method according to any one of Supplementary Notes B23 to B43; and
a feature analysis step of analyzing at least one visualization data selected from the group consisting of a feature quantity of each image, the image-processed data, the trait analysis data, and sensing data to extract a feature of the farm field or the plant.
(Supplementary Note B45)
A program for a computer to execute the method according to any one of Supplementary Notes B23 to B43.
(Supplementary Note B46)
A program for a computer to execute the method according to Supplementary Note B44.
(Supplementary Note B47)
A computer readable recording medium with the program according to Supplementary Note B45 or B46.

INDUSTRIAL APPLICABILITY

According to the present invention, for example, by utilizing the aerial image during the deciduous period, it is possible to easily identify crowns of individual fruit trees with better accuracy. For this reason, the present invention is extremely useful for the cultivation of fruit trees in orchards.

REFERENCE SIGNS LIST

40: Identification device
41: Identification criterion determination unit
411: First image acquisition section
412: Skeleton extraction section
413: Vertex extraction section
414: Identification criterion extraction section
42: Crown identification unit
421: Second image acquisition section
422: Whole crown extraction section
423: Crown identification section
43: Fruit tree trait analysis unit
44: Storage
1, 6: Breeding data collection device
100: Storage
101: Information storage unit
102: Processed information storage unit
110: Processor
111: Classification unit
112: Image processing unit
113: Visualization unit
120: Output unit
2: Client terminal
32: Communication network

The invention claimed is:

1. A device for identifying a crown of an individual fruit tree that exhibits a complex shape in an image, the device comprising at least one processor configured to:
   acquire a first aerial image including a plurality of individual fruit trees that exhibit a complex shape in a deciduous period in a fruit farm field;
   process the first aerial image to extract a whole crown skeleton including the plurality of individual fruit trees;
   extract vertexes of each crown skeleton corresponding to each individual fruit tree;
   extract a crown candidate region of a minimum polygonal shape including all the vertexes as an identification criterion for each individual fruit tree and extracts a centroid of the crown candidate region;
   acquire a second aerial image of the fruit tree farm field at the time of identifying a crown at the same scale as the first aerial image;
   processes the second aerial image to extract a whole crown image including the plurality of individual fruit trees; and
   collate the crown candidate region and the centroid of the identification criterion with the whole crown image to identify a crown region of each individual fruit tree in the second aerial image.

2. The device according to claim 1, wherein the processor is configured to:
   collate the crown candidate region and the centroid as the identification criterion with the whole crown image to extract a crown candidate region of each individual fruit tree; and
   identify the crown region of each individual fruit tree from the crown candidate region and a minute region surrounding the crown candidate region.

3. The device according to claim 1, wherein the processor is configured to analyze a trait of an identified crown region.

4. The device according to claim 1, wherein the processor is configured to output the crown region.

5. A computer-implemented method for identifying crowns of a plurality of individual fruit trees that exhibit a complex shape in an image, the method comprising:
   acquiring a first aerial image including a plurality of individual fruit trees that exhibit a complex shape in a deciduous period in a fruit farm field;
   processing the first aerial image to extract a whole crown skeleton including the plurality of individual fruit trees;
   extracting vertexes of each crown skeleton corresponding to each individual fruit tree;
   extracting a crown candidate region of a minimum polygonal shape including all the vertexes as an identification criterion for each individual fruit tree and extracting a centroid of the crown candidate region;
   acquiring a second aerial image of the fruit tree farm field at the time of identifying a crown at the same scale as the first aerial image;
   processing the second aerial image to extract a whole crown image including the plurality of individual fruit trees; and
   collating the crown candidate region and the centroid of the identification criterion with the whole crown image to identify a crown region of each individual fruit tree in the second aerial image.

6. The method according to claim 5, wherein the crown region and the centroid as the identification criterion are collated with the whole crown image to identify a crown candidate region of each individual fruit tree, and
   wherein the crown region of each individual fruit tree is identified from the crown candidate region and a minute region surrounding the crown candidate region.

7. The method according to claim 5, further comprising analyzing a trait of an identified crown region.

8. The method according to claim 5, further comprising outputting the crown region.

9. A non-transitory computer readable recording medium with a program for a computer to execute the method according to claim 5.

10. The device according to claim 1, wherein the second aerial image is an image that includes a fruit tree whose branches and leaves overlap those of an adjacent fruit tree.

11. The computer-implemented method according to claim 5, wherein the second aerial image is an image that includes a fruit tree whose branches and leaves overlap those of an adjacent fruit tree.

* * * * *